United States Patent
Isomura

(10) Patent No.: US 8,111,948 B2
(45) Date of Patent: Feb. 7, 2012

(54) ALBUM CREATING APPARATUS, ALBUM CREATING METHOD AND COMPUTER READABLE MEDIUM

(75) Inventor: Ayumu Isomura, Minato-ku (JP)

(73) Assignee: Fujifulm, Tokyo (JP)

( * ) Notice: Subject to any disclaimer, the term of this patent is extended or adjusted under 35 U.S.C. 154(b) by 1073 days.

(21) Appl. No.: 11/947,360

(22) Filed: Nov. 29, 2007

(65) Prior Publication Data

US 2008/0089612 A1    Apr. 17, 2008

Related U.S. Application Data

(63) Continuation of application No. PCT/JP2006/310505, filed on May 19, 2006.

(30) Foreign Application Priority Data

May 30, 2005    (JP) .................... 2005-157782

(51) Int. Cl.
G06K 9/32    (2006.01)
G06K 9/54    (2006.01)
G06F 17/00    (2006.01)

(52) U.S. Cl. .............. 382/294; 382/305; 715/235

(58) Field of Classification Search ............ 382/209, 382/217, 218, 291, 294, 295, 305, 312; 715/235, 715/243, 251, 255; 358/1.17, 1.18; 283/17, 283/36; 281/15.1; 40/700
See application file for complete search history.

(56) References Cited

U.S. PATENT DOCUMENTS

| 4,794,713 A * | 1/1989 | Yang ................. 40/726 |
| 6,056,494 A * | 5/2000 | Fong et al. ............ 412/37 |
| 6,123,362 A * | 9/2000 | Squilla et al. .......... 283/67 |
| 6,288,719 B1 * | 9/2001 | Squilla et al. ......... 715/805 |
| 6,362,900 B1 * | 3/2002 | Squilla et al. ......... 358/442 |
| 7,047,490 B1 | 5/2006 | Markovic |
| 7,350,236 B1 * | 3/2008 | Silverbrook et al. ....... 726/26 |
| 7,545,521 B2 * | 6/2009 | Hanamoto et al. ....... 358/1.1 |

(Continued)

FOREIGN PATENT DOCUMENTS

EP    0975147 A2    1/2000

(Continued)

OTHER PUBLICATIONS

Supplementary European Search Report, for EP 06756605, dated Jun. 9, 2011.

(Continued)

*Primary Examiner* — Kanjibhai Patel
(74) *Attorney, Agent, or Firm* — Sughrue Mion, PLLC

(57) ABSTRACT

An album creating apparatus is provided, for creating an album by automatically moving the position of the main object in a page when the main object is overlapped with a fold of the album. The album creating apparatus according to an aspect of the invention includes: an image storage section; an image classification section that classifies a plurality of images into each facing page in an album; an image layout section that lays out the images classified by the image classification section into each facing page in the album; a boundary position storage section that stores the position of the page break of the facing page; a boundary judgment section that judges whether the main object in the image laid out by the image layout section is overlapped with the page break; and a main object moving section that moves the position of the main object such that the main object is not overlapped with the page break.

6 Claims, 13 Drawing Sheets

U.S. PATENT DOCUMENTS

| | | | |
|---|---|---|---|
| 7,593,950 B2 * | 9/2009 | Silverman et al. | 1/1 |
| 2003/0133162 A1 | 7/2003 | Lupien | |
| 2003/0227652 A1 | 12/2003 | Masaki | |
| 2004/0165000 A1 | 8/2004 | Nagahashi et al. | |
| 2005/0071783 A1 | 3/2005 | Atkins | |
| 2005/0094846 A1 | 5/2005 | Watanabe | |
| 2006/0182484 A1 * | 8/2006 | Xie et al. | 400/619 |

FOREIGN PATENT DOCUMENTS

| | | |
|---|---|---|
| JP | 03-244570 A | 10/1991 |
| JP | 10074265 A | 3/1998 |
| JP | 2000316131 A | 11/2000 |
| JP | 2002-111995 A | 4/2002 |
| JP | 2002111995 A | 4/2002 |
| JP | 2002268451 A | 9/2002 |
| JP | 2003-230005 A | 8/2003 |
| JP | 2003230005 A | 8/2003 |
| JP | 2004-175014 A | 6/2004 |
| JP | 2004-199248 A | 7/2004 |
| JP | 2005-64916 A | 3/2005 |
| JP | 2005064916 A | 3/2005 |
| JP | 2005159971 A | 6/2005 |

OTHER PUBLICATIONS

Japanese Office Action corresponding to Patent Application No. 2006-131963 dated Apr. 12, 2011.

* cited by examiner

ALBUM CREATING APPARATUS, ALBUM CREATING METHOD AND COMPUTER READABLE MEDIUM

CROSS REFERENCE TO RELATED APPLICATION

This is a continuation application of PCT/JP2006/310505 filed on May 19, 2006 which claims priority from a Japanese Patent Application No. 2005-157782 filed on May 30, 2005, the contents of which are incorporated herein by reference.

BACKGROUND

1. Technical Field

The present invention relates to an album creating apparatus, an album creating method, and an album creating program. Particularly, the present invention relates to an album creating apparatus, an album creating method, and an album creating program for creating an album in which the main object is not overlapped with the page break.

2. Related Art

A method for preventing a fold line or a page break from overlapping with an image portion such as characters when a document with a plurality of pages is recorded on a long sheet and the long sheet is folded in each page, has been proposed. The method includes the steps of: detecting the length of a sub-scanning direction in an image region for each document; changing magnification such that the length of the sub-direction in the image region for each document is fixed based on the detected length; and forming an image of partition line on the border line on each image region in the long sheet, for example as disclosed in Japanese Patent Application Publication No. 1997-080976.

However, the above-described technique can not be applied to create an album having a facing page because it can be used only to a long sheet such as a roll sheet. Additionally, even if an image is permitted to overlap on the page break, the image is processed so as not to overlap with the page break, so that the degree of freedom of the layout is limited in creating an album.

SUMMARY

Thus, an advantage of some aspects of the invention is to provide an album creating apparatus, an album creating method and an album creating program which are capable of solving the problem accompanying the above-described technique. The above and other objects can be achieved by combining the features recited in independent claims. Then, dependent claims define further effective specific example of the present invention.

A first aspect of the present invention provides an album creating apparatus. The album creating apparatus includes: an image layout section for laying out a plurality of images into each page in an album; a boundary position storage section for storing the position of the fold of the page including a fold; a boundary judgment section for judging whether the main object in the image laid out into the fold page by the image layout section is overlapped with the position of the fold of the page stored in the boundary position storage section; and a main object moving section for moving the position of the main object on the fold page such that the main object is not overlapped with the fold of the page when the boundary judgment section is judged that the main object is overlapped with the fold of the page.

The album creating apparatus further includes an image classification section for classifying the plurality of images into each facing page being a fold page. The image layout section may lay out the images classified into each facing page by the image classification section into each facing page in an album. The boundary position storage section stores the position of the page break between the right page and the left page of the facing page. The boundary judgment section may judge whether the main object in the image laid out into the facing page by the image layout section is overlapped with the page break stored in the boundary position storage section. The main object moving section may move the position of the main object in the facing page such that the main object is not overlapped with the page break when the boundary judgment section judges that the main object is overlapped with the page break.

The image layout section may lay out the plurality of images into the cover including the obverse cover, the backbone and back cover of the album. The boundary position storage section stores the position of the fold of the cover of the album. The boundary judgment section judges whether the main object in the image laid out into the cover by the image layout section is overlapped with the position of the fold of the cover stored in the boundary position storage section. The main object moving section may move the position of the main object to the cover such that the main object is not overlapped with the position of the fold of the cover when the boundary judgment section judges that the main object is overlapped with the position of the fold of the cover.

The album creating apparatus further includes a title frame positional information storage section for storing the position of a title frame in which character string information disposed on the cover of the album which includes at least one of the obverse cover, the backbone and back cover as title frame positional information. The image layout section may lay out the plurality of images into the cover of the album. The boundary judgment section judges whether the main object in the image laid out into the cover by the image layout section is overlapped with the position of the title frame stored in the title frame positional information storage section. The main object moving section may move the position of the main object on the cover such that the main object is not overlapped with the title frame when the boundary judgment section judges that the main object is overlapped with the title frame.

Then, the title frame positional information storage section may store the position of the title frame in which the character string information disposed on the backbone of the album is laid out as title frame positional information. The image layout section may lay out a plurality of images into the backbone of the album. The boundary judgment section judges whether the main object in the image laid out in the backbone by the image layout section is overlapped with the position of the title frame stored in the title frame positional information storage section. The main object moving section may move the position of the main object on the backbone such that the main object is not overlapped with the title frame when the boundary judgment section judges that the main object is overlapped with the position of the title frame.

Additionally, the main object moving section may move the position of the main object on the fold page such that the main object is not overlapped with the fold of the page by moving on the fold page the image judged by the boundary judgment section as that the main object is overlapped with the fold of the page. The main object moving section may move the position of the main object on the fold page such that the main object is not overlapped with the fold of the page by moving the main object judged by the boundary judgment section as that the main object is overlapped with the fold of the page.

Additionally, the image creating apparatus may further include an object extracting section for extracting the object included in the image laid out by the image layout section, an object type identifying section for identifying the type of object extracted by the object extracting section and a main object determining section for determining that the object identified by the object type identifying section as that its type is a person is a main object. The main object moving section may move the position of the person on the fold page such that the person's face is not overlapped with the fold of the page when the main object judged by the boundary judgment section that the main object is overlapped with the fold of the page is a person.

A second aspect of the present invention provides an album creating method. The album creating method includes the steps of: laying out a plurality of images into each page in an album; referring a boundary position storage section for storing the position of the fold of the page including a fold; judging whether the main object in the image laid out into the fold page in the image laying out step is overlapped with the fold of the page referred in the boundary position referring step; moving the position of the main object on the fold page such that the main object is not overlapped with the fold of the page when it is judged that the main object is overlapped with the fold of the page in the boundary judging step.

A third aspect of the present invention provides a computer readable medium storing thereon an album creating program for an album creating apparatus. The album creating program operates the album creating apparatus to function as: an image layout section for laying out a plurality of images into each page in an album; a boundary position storage section for storing the position of the fold of the page including a fold; a boundary judgment section for judging whether the main object in the image laid out into the fold page by the image layout section is overlapped with the position of the fold of the page stored in the boundary position storage section; and a main object moving section for moving the position of the main object on the fold page such that the main object is not overlapped with the fold of the page when the boundary judgment section is judged that the main object is overlapped with the fold of the page.

A fourth aspect of the present invention provides an album creating apparatus. The album creating apparatus includes: an image layout section for laying out a plurality of images into a template of an album which is previously generated; a template image position storage section for storing the position of a template image disposed in the template of the album; an overlap judgment section for judging whether the main object in the image laid out in the template of the album by the image layout section is overlapped with the position of the template stored in the template image position storage section; and a main object moving section for moving the position of the main object on the page of the album such that the main object is not overlapped with the template image when the overlap judgment section judges that the main object is overlapped with the position of the template image.

The main object moving section may move the position of the main object on the template image such that the main object is not overlapped with the template image by moving on the template image the image judged by the overlap judgment section as that the main object is overlapped with the position of the template image stored in the template image position storage section. Additionally, the main object moving section may move the position of the main object on the template image such that the main object is not overlapped with the template image by moving the main object judged by the overlap judgment section as that the main object is overlapped with the position of the template image in the image judged by the overlap judgment section as that the main object is overlapped with the position of the template image.

A fifth aspect of the present invention provides an album creating method. The album creating method includes: laying out a plurality of images into a template of an album which is previously generated; referring a template image position storage section for storing the position of a template image disposed in the template of the album; judging whether the main object in the image laid out in the template of the album in the image laying out step is overlapped with the position of the template stored in the template image position referring step; and moving the position of the main object on the page of the album such that the main object is not overlapped with the template image when it is judged that the main object is overlapped with the position of the template image in the overlap judging step.

A sixth aspect of the present invention provides a computer readable medium storing thereon an album creating program for an album creating apparatus for creating an album. The album creating program operates the album creating apparatus to function as: an image layout section for laying out a plurality of images into a template of an album which is previously generated; a template image position storage section for storing the position of a template image disposed in the template of the album; an overlap judgment section for judging whether the main object in the image laid out in the template of the album by the image layout section is overlapped with the position of the template stored in the template image position storage section; and a main object moving section for moving the position of the main object on the page of the album such that the main object is not overlapped with the template image when the overlap judgment section judges that the main object is overlapped with the position of the template image.

A seventh aspect of the present invention provides an album creating apparatus for creating an album by laying out images into an album template having a page template including a layout frame which is previously arranged to fit the image therein. The album creating apparatus includes: a fold position storage section for storing the position of the fold included in the page template in the layout frame previously arranged in the page template of the page with the fold; a main object region judgment section for judging the region of the main object in the image; an image comparison section for comparing, for each image, the position of the fold on the layout frame stored in the fold position storage section with the region of the main object in the image judged by the main object region judgment section to judge whether the fold of the page template is overlapped with the main object when the image is arranged in the layout frame; an image selecting section for selecting an image in which the fold of the page template is not overlapped with the main object in the image based on the judged result by the image comparison section when the image is arranged in the layout frame; and an image layout section for laying out the image selected by the image selecting section into the layout frame.

An eighth aspect of the present invention provides an album creating method for creating an album by laying out images into an album template having a page template including a layout frame which is previously arranged to fit the image therein. The image creating method includes: referring a fold position storage section for storing the position of the fold included in the page template in the layout frame previously arranged in the page template of the page with the fold; judging the region of the main object in the image; comparing, for each image, the position of the fold on the layout frame referred in the fold position referring step with the region of the main object in the image judged in the main object region judging step to judge whether the fold of the page template is overlapped with the main object when the image is arranged in the layout frame; selecting an image in which the fold of the page template is not overlapped with the main object in the image based on the judged result in the image comparing step when the image is arranged in the layout frame; and laying out the image selected in the image selecting step into the layout frame.

A ninth aspect of the present invention provides a computer readable medium storing thereon an album creating program for an album creating apparatus for creating an album by laying out images into an album template having a page template including a layout frame which is previously arranged to fit the image therein. The album creating program operates the album creating apparatus to function as: a fold position storage section for storing the position of the fold included in the page template in the layout frame previously arranged in the page template of the page with the fold; a main object region judgment section for judging the region of the main object in the image; an image comparison section for comparing, for each image, the position of the fold on the layout frame stored in the fold position storage section with the region of the main object in the image judged by the main object region judgment section to judge whether the fold of the page template is overlapped with the main object when the image is arranged in the layout frame; an image selecting section for selecting an image in which the fold of the page template is not overlapped with the main object in the image based on the judged result by the image comparison section when the image is arranged in the layout frame; and an image layout section for laying out the image selected by the image selecting section into the layout frame.

A tenth aspect of the present invention provides an album creating apparatus for creating an album by laying out images into an album template having a page template including a layout frame which is previously arranged to fit the image therein. The album creating apparatus includes: a template image storage section for storing the position of a template image included in a page template on a layout frame previously arranged in the page template of a page including the template image; a main object region judgment section for judging the region of the main object in the image; an image comparison section for comparing, for each image, the position of the template image on the layout frame stored in the template position storage section with the region of the main object in the image judged by the main object region judgment section to judge whether the template image of the page template is overlapped with the main object of the image when the image is arranged in the layout frame; an image selecting section for selecting the image in which the template image of the page template is not overlapped with the main object of the image based on the judged result of the image comparison section when the image is arranged in the layout frame; and an image layout section for laying out the image selected by the image selecting section into the layout frame.

An eleventh aspect of the present invention provides an album creating method for creating an album by laying out images into an album template having a page template including a layout frame which is previously arranged to fit the image therein. The album creating method includes the steps of: referring a template image storage section for storing the position of a template image included in a page template on a layout frame previously arranged in the page template of a page including the template image; judging the region of the main object in the image; comparing, for each image, the position of the template image on the layout frame referred in the template position referring step with the region of the main object in the image judged in the main object region judging step to judge whether the template image of the page template is overlapped with the main object of the image when the image is arranged in the layout frame; selecting the image in which the template image of the page template is not overlapped with the main object of the image based on the judged result of the image comparing step when the image is arranged in the layout frame; laying out the image selected in the image selecting step into the layout frame.

A twelfth aspect of the present invention provides a computer readable medium storing thereon an album creating program for an album creating apparatus for creating an album by laying out images into an album template having a page template including a layout frame which is previously arranged to fit the image therein. The album creating program operates the album creating apparatus to function as: a template image storage section for storing the position of a template image included in a page template on a layout frame previously arranged in the page template of a page including the template image; a main object region judgment section for judging the region of the main object in the image; an image comparison section for comparing, for each image, the position of the template image on the layout frame stored in the template position storage section with the region of the main object in the image judged by the main object region judgment section to judge whether the template image of the page template is overlapped with the main object of the image when the image is arranged in the layout frame; an image selecting section for selecting the image in which the template image of the page template is not overlapped with the main object of the image based on the judged result of the image comparison section when the image is arranged in the layout frame; and an image layout section for laying out the image selected by the image selecting section into the layout frame.

Here, all necessary features of the present invention are not listed in the summary of the invention. The sub-combinations of the features may become the invention.

According to an aspect of the invention, an album can be created by automatically moving the main object in a facing page even if the main object included in the captured image is overlapped with the page break in the album.

DESCRIPTION OF EXEMPLARY EMBODIMENTS

Hereinafter, the present invention will now be described through some embodiments. The embodiments do not limit the invention according to claims and all combinations of the features described in the embodiments are not necessarily essential to means for solving the problems of the invention.

Figure 1:
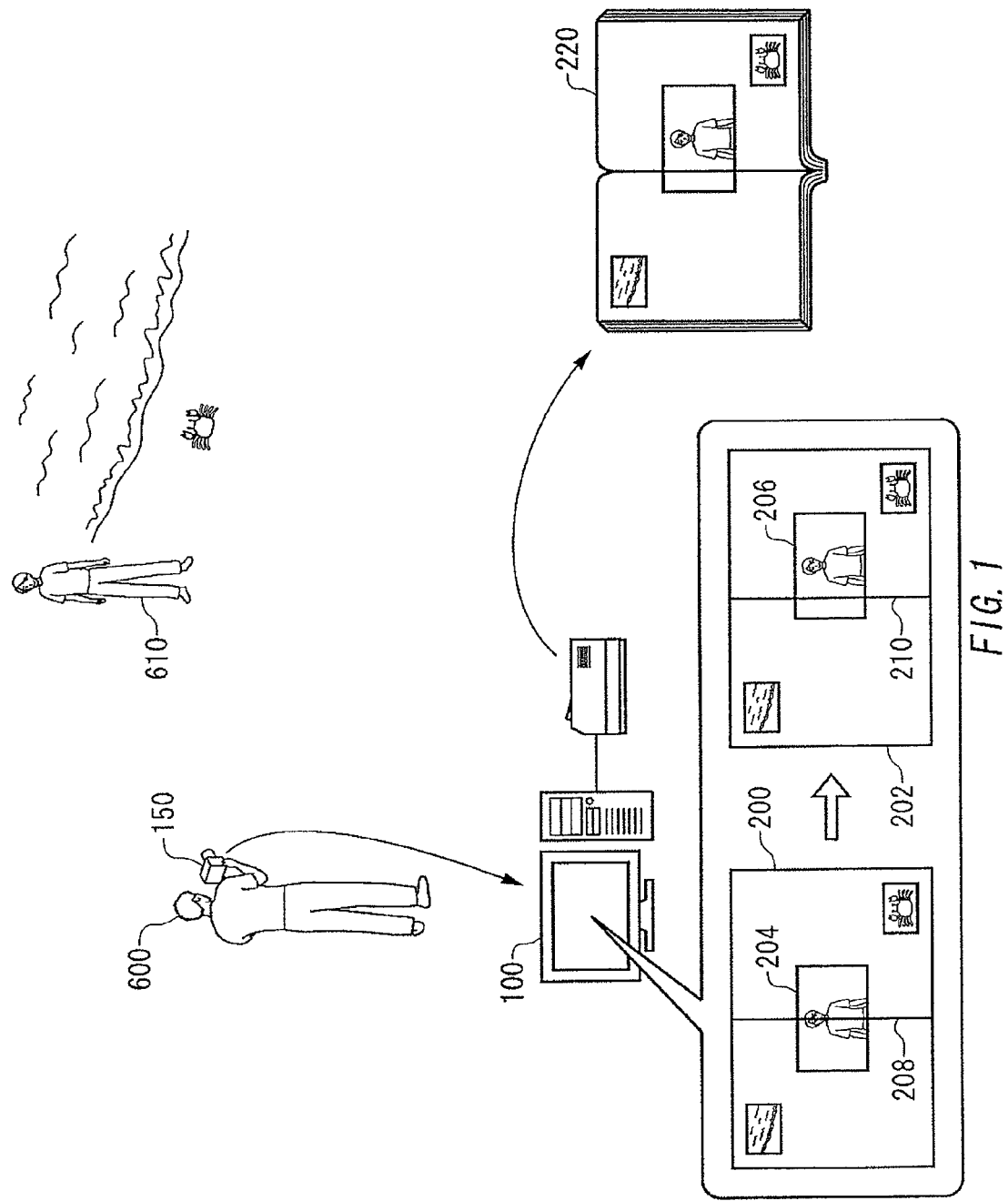
FIG. 1 is conceptual diagram of an album creating apparatus 100.

FIG. 1 is conceptual diagram of an album creating apparatus 100 according to an embodiment of the present invention. The object of the album creating apparatus 100 according to the present embodiment is to create an album by moving the position of a main object in a facing page when the main object included in a captured image is overlapped with the page break. Here, the facing page is an example of a page including a fold, and the page break in the fold page is an example of the fold in the page with the fold. The fold page may include a page, a foldout page, the obverse cover, the backbone and the back cover of an album.

A user 600 captures an image of a subject 610 using an image capturing apparatus 150, for example. The image capturing apparatus 150 stores the captured image. Then, the image capturing apparatus 150 provides the captured image to the album creating apparatus 100 through a network such as a memory and Internet. The album creating apparatus 100 classifies a plurality of received images according to a predetermined reference. Then, an album creating apparatus 100 selects the image including the main object from the plurality of classified captured images. Next, the album creating apparatus 100 lays out the plurality of captured images including the selected image into a facing page 200 in the album. Here, the main object may be the object frequently appearing among the objects included in the classified images. Additionally, the main object may be an object which is more active among the objects included in the classified image. Further, when a plurality of objects are included in the classified image, an object of which kind is a person may be the main object.

For example, in the facing page in which the images have been laid out, a page break 208 in the album is overlapped with the image of the person being the main object included in a captured image 204. In this case, the album creating apparatus 100 moves the position of the main object to a facing page 200 such that the image of the person being the main object is not overlapped with the page break 208. Then, the album creating apparatus 100 creates a facing page 202. The album creating apparatus 100 outputs the created facing page 202 to a printer and a display to create an album.

The above-described album creating apparatus 100 can create an album by automatically moving the position of the main object included in the image to the position at which the main object is not overlapped with the fold of the page even if the fold of the page in the album is overlapped with the main object included in the image in the case that the image is laid out in the page of the album. Thereby the viewer of the album can clearly recognize the object desired to view by a viewer so that the satiability of the viewer can be increased.

Figure 2:
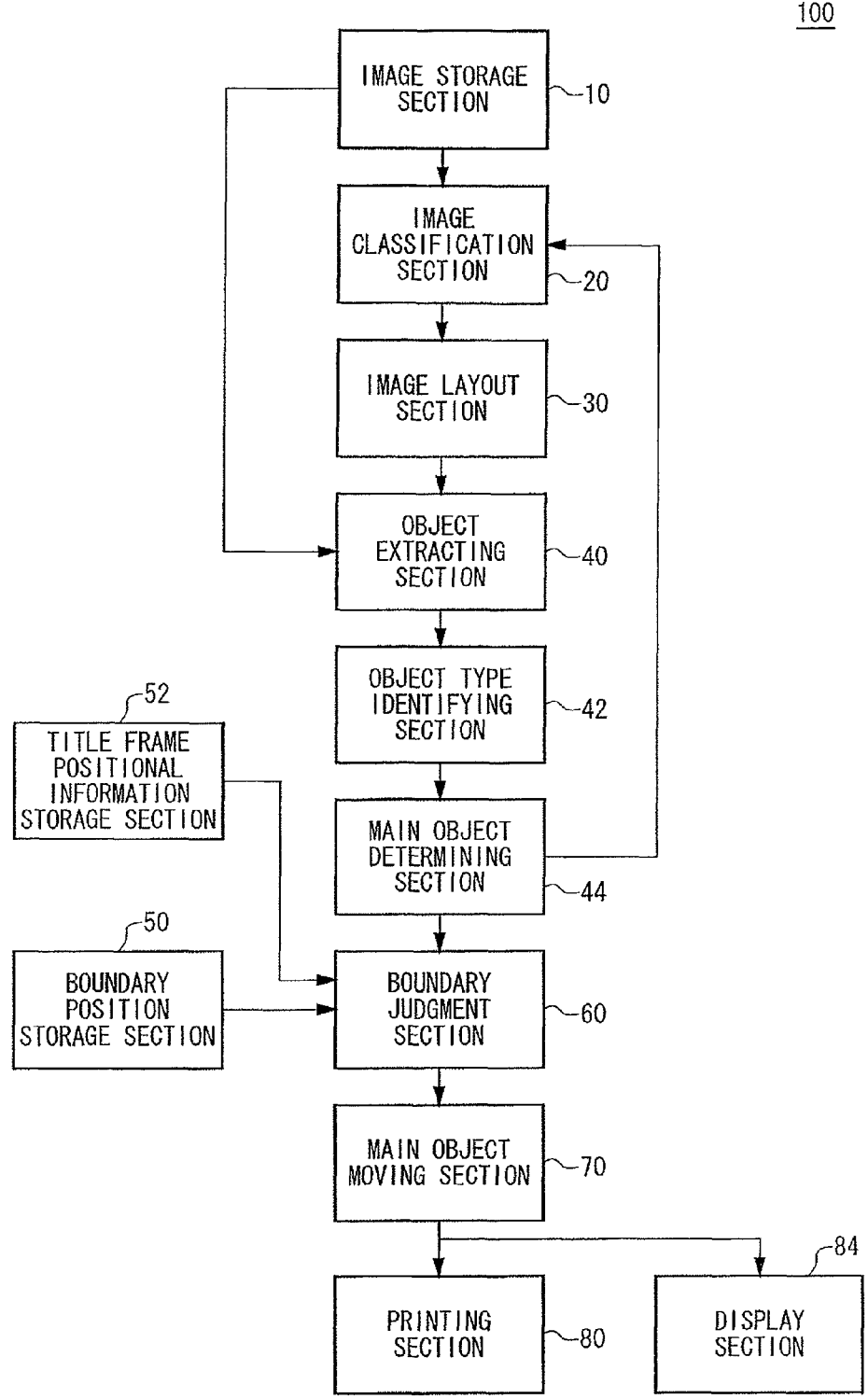
FIG. 2 is a block diagram of the functional configuration of the album creating apparatus 100.

FIG. 2 is a block diagram of the functional configuration of the album creating apparatus 100 according to the present embodiment. The album creating apparatus 100 includes an image storage section 10, an image classification section 20, an image layout section 30, an object extracting section 40, an object type identifying section 42, a main object determining section 44, a boundary position storage section 50, a title frame positional information storage section 52, a boundary judgment section 60, a main object moving section 70, a printing section 80 and a display section 84. The image storage section 10 stores a plurality of images received from the image capturing apparatus 150. The image storage section 10 stores each image in association with an identifier to uniquely identify the image. Additionally, the image storage section 10 may store the image, and the position and the time at which the image is captured in association with the identifier. Further, the image storage section 10 may store the image, the focal distance at which the image is captured and the hue of the captured image in association with the identifier. Additionally, information indicative of the position of the main object in the image may be tagged to the image. The image storage section 10 may further store the position of the image of the main object in association with the identifier. The image storage section 10 provides a plurality of images to the image classification section 20 and the object extracting section 40.

The image classification section 20 classifies the plurality of images received from the image storage section 10 into each page in the album. Additionally, the image classification section 20 may classify the plurality of images into each facing page. Further, the image classification section 20 may receive the main object determined for each of the plurality of images from the main object determining section 44. Then, the image classification section 20 may classify the plurality of images based on the position and the time at which the image is captured. The image classification section 20 may classify the plurality of images based on the main object determined by the main object determining section 44. Here, the captured image may be an example of image.

Here, the image classification section 20 may set a theme for each of the plurality of facing pages and classify the plurality of images such that the plurality of images are classified along each theme. The theme may be an interest item for the viewer of the album. The theme may be a trip, an athletic festival and a pet, for example. That is to say, if the theme is a trip, the image classification section 20 classifies a plurality of images captured during the trip into each place. Additionally, if the theme is an athletic festival, the image classification section 20 extracts the image regarding the athletic festival among the plurality of images and classifies the same into each competition or person. Further, the theme may be regarding a pet and a specified object. The theme of facing page may be determined based on the type of the main object included in the captured image at any time. The image classification section 20 provides the plurality of classified images to the image layout section 30.

The image layout section 30 lays out the plurality of images into each page in the album. Specifically, the image layout section 30 lays out the plurality of pages into a fold page which is a page with a fold. Additionally, the image layout section 30 lays out the plurality of classified images which are received from the image classification section 20 into each of the facing pages in the album. When the classified images are laid out into the facing page in the album, the image layout section 30 may lay out the image into a page template including a layout frame which is previously arranged to fit the image therein. In this case, the layout frame which is previously arranged to fit the image therein may be previously determined. Additionally, the image layout section 30 may lay out the plurality of images into the cover including an obverse cover, a backbone and a back cover of the album. For example, the image layout section 30 may lay out the image into the backbone of the album. Further, the image layout section 30 may lay out the image into a template in the form of a CD-ROM and a DVD. The image layout section 30 provides the image laid out into the page of the album to the object extracting section 40.

The object extracting 40 extracts the image of the object included in the image laid out into the facing page in the album, which is received from the image layout section 30. The object extracting section 40 extracts the image of the object through an image processing such as an outline extraction processing and a color distribution analysis processing. Then, the object extracting section 40 provides the image of the extracted object and the image laid out in the facing page of the album to the object type identifying section 42. The object type identifying section 42 identifies the type of the extracted object which is received from the object extracting section 40.

The object type identifying section 42 may identify the type of the object by pattern-matching the image of the object received from the object extracting section 40 with a pattern image of a human body, a pattern image of animals and plants, a pattern image of a vehicle such as a car and a pattern image of a building. When the identified object is a person, the object type identifying section 42 may further identify the facial region of the person. The facial region of the person can identified based on the shape of the outline of the person's face, the shape of a feature in the face such as an eye, a nose and a mouth and the position of each part in the face. Additionally, the object type identifying section 42 provides the identified object type and the image laid out in the page of the album to the main object determining section 44.

When the type of object received from the object type identifying section 42 is a person, the main object determining section 44 determines that the object is the main object. Additionally, the main object determining section 44 may determined that the object captured at a frequency more than a predetermined value among the plurality of classified captured images, which are included in the plurality of captured images classified in the image classification section 20 is the main object. Thereby the main object determining section 44 can determine the person and the object which are frequently captured as the main object.

Additionally, the main object determining section 44 calculates positional information indicative of the position at the captured image. Here, the positional information may be calculated in association with the coordinate. For example, the main object determining section 44 calculates the range for the main object in the captured image in association with the coordinate. The range for the main object may be calculated by setting the coordinate axis to the captured image. Further, the main object determining section 44 may calculate the position of the person's face in association with the coordinate when the main object is a person.

Further, the main object determining section 44 may determine the main object as follows. Firstly, the image capturing apparatus 150 captures a pre-image at a plurality of focal distances. Next, the main object determining section 44 receives a plurality of pre-images from the image capturing apparatus 150 and calculates the special frequency of each pre-image. Then, the main object determining section 44 may determine the object included in the image captured at the focal distance at which the pre-image of which high-frequency component is higher than a predetermined level as the main object. Here, the pre-image may be an image which is acquired by the image capturing apparatus 150 in order to determine the image capturing condition such as the focal position. For example, the pre-image may be an image with the resolution lower than that of the image captured at each focal position. The main object determining section 44 provides the image including the object determined as the main object, the positional information indicative of the position of the main object in the image and the image laid out into the page in the album by the image layout section 30 to the boundary judgment section 60 and the image classification section 20.

The boundary position storage section 50 stores the position of the fold in the fold page. Additionally, the boundary position storage section 50 may store the position of the fold of the cover of album. Further, the boundary position storage section 50 stores the position of the border line between the light page and the left page of the facing page in the album. The boundary position storage section 50 may set the coordinate axis to the facing page and store the position of the page break in association with the coordinate. Additionally, the boundary position storage section 50 may store the coordinates indicative of the position of the different page breaks in association with the size of album. Here, the page break of the facing page, the fold line of the fold of the cover may be an example of the fold of the page. Additionally, the facing page may be the right page and the left page in the book-type album and also may be a plurality of pages with the fold in the foldout page. For example, when an album created with a gate-fold, not only the page break between the right page and the left page in the facing page but also the center fold line between the right page and the left page may be a page break. Further, when pages with a bellows-fold are created, and when the foldout page is inserted between the pages, the fold of each page may be the page break. When the template into which the images are laid out by the image layout section 30 is a template for a CD-ROM and a DVD, the boundary position storage section 50 may store the position of the hole of the CD-ROM and the DVD. The boundary position storage section 50 provides the position of the fold of the page to the boundary judgment section 60 based on the control of the boundary judgment section 60.

The title frame positional information storage section 52 stores the position of the title frame into which character string information arranged on the cover of the album including at least one of an obverse cover, a backbone and a back cover is laid out as title frame positional information. For example, the title frame positional information storage section 52 may store the position of the title frame into which the character string information arranged on the backbone of the album is laid out as the title frame positional information. Here, the character string information laid out into the title frame may be the character string indicative of the theme of the album. For example, if the theme of the album is an athletic festival, the character string information may be a character string indicative of the athletic festival. Additionally, if the theme of the album is a trip, the character string information may be a character string including the place name in the trip. The title frame positional information storage section 52 provides the title frame positional information to the boundary judgment section 60 based on the control of the boundary judgment section 60.

The boundary judgment section 60 judges whether the main object in the image laid out into the fold page by the image layout section 30 is overlapped with the fold of the page received from the boundary position storage section 50. When the image layout section 30 lays out the image into the cover of the album, the boundary judgment section 60 judges whether the main object is overlapped with the position of the fold of the cover. Additionally, the boundary judgment section 60 may judge whether the main object in the image laid out into the cover by the image layout section 30 is covered with the position of the title frame received from the title frame positional information storage section. For example, the boundary judgment section 60 may judge whether the main object included in the image is overlapped with the position of the title frame arranged on the backbone. Here, the boundary judgment section 60 may judge whether the main object is overlapped the hole of the template for a CD-ROM when the template is a template for a CD-ROM or a DVD. The boundary judgment section 60 provides information indicating whether the main object in the image is overlapped with the position of the fold of the page and the image laid out into the page.

The boundary judgment section 60 may judge whether the main object in the image laid out into the page by the image layout section 30, which is received from the main object determining section 44 is overlapped with the position of the page break received from the boundary position storage section 50. For example, the boundary judgment section corresponds the coordinate axis of the page to the coordinate axis of the captured image. Then, the boundary judgment section 60 compares the coordinate associated with the page break with the coordinate associated with the range for the main object included in the image. Then, the boundary judgment section 60 provides information indicating that the main object is overlapped with the page break to the main object moving section 70 along with the image laid out by the image layout section 30. Meanwhile, when the range for the main object is not overlapped with the page break, the boundary judgment section 60 provides the image laid out in the page of the album by the image layout section 30 to the printing section 80 and the display section 84.

The main object moving section 70 moves the position of the main object in the fold page such that the main object is not overlapped with the fold of the page when the boundary judgment section 60 judges that the main object is overlapped with the fold of the page. Additionally, in the case that the image layout section 30 lays out the image into the cover of the album, the main object moving section 70 moves the main object in the cover such that the main object is not overlapped with the position of the fold of the cover when the boundary judgment section 60 judges that the main object is overlapped with the position of the fold of the cover. Additionally, the main object moving section 70 may move the position of the main object in the cover such that the main object is not overlapped with the position of the title frame when the boundary judgment section 60 is judges that the main object is overlapped with the position of the title frame. For example, in the case that the image layout section 30 lays out the image into the backbone in the album, the main object moving section 70 may move the position of the main subject in the title frame of the backbone when the boundary judgment section 60 judges that the position of the main object included in the image is overlapped with the position of the title frame of the backbone. Here, the direction to which the main object moving section 70 moves the main object may be any direction from which the main object leaves the title frame. For example, the direction may be any direction including the left, right, top and bottom based on the position of the title frame.

The main object moving section 70 moves the main object in the facing page such that the main object is not overlapped with the page break when the main object moving section 70 receives information indicating that the main object is overlapped with the page break of the facing page from the boundary judgment section 60. For example, the main object moving section 70 moves the image including the main object to the direction from which the main object leaves the page break in the facing page to prevent the main object from overlapping with the page break. Additionally, when the main object moving section 70 receives information indicating that the main object is overlapped with the page break, the main object moving section 70 does not move the position of the image in the facing page but moves the position of the main object included in the image in the facing page so as not to overlap the main object with the page break.

Further, the main object moving section 70 trims a partial region for the main object included in the image. Then, the main object moving section 70 enlarges the trimmed partial region to the size for the layout frame into which the captured image which has not been trimmed is fitted. Then, the main object moving section 70 may fit the enlarged partial region into the layout region of the facing page. Additionally, when the main object determining section determines that the main object is a person, and the boundary judgment section 60 judges that the face of the person is overlapped with the page break, the main object moving section 70 may move the position of the person in the facing page such that the face of the person is not overlapped with the page break. The main object moving section 70 provides the page in which the position of the main object has been moved to the printing section 80 and the display section 84.

Here, if the template is a template for a CD-ROM and a DVD, the main object moving section 70 may move the position of the main object such that the main object included in the image is not overlapped with the hole of the CD-ROM and the DVD. Specifically, the main object moving section 70 may move the position of the main object to the hole such that the main object is not overlapped with the hole when the boundary judgment section 60 judges that the main object is overlapped with the hole of the template for the CD-ROM.

The printing section 80 prints the pages received from the main object moving section 70 and the boundary judgment section 60 to create an album. Additionally, the printing section 80 may print the page on the surface of the CD-ROM and the DVD. Further, the printing section 80 may display the page on the display 84 having a display device such as a monitor as an electronic album.

The album creating apparatus 100 according to the present embodiment can automatically prevent the main object such as a person included in the captured image from overlapping the fold of the fold page in the album. Thereby the viewer can view the album in which the fold is not overlapped with the interest main object so that the satiability of the viewer can be increased.

Further, the album creating apparatus 100 according to the present embodiment can create the album with the layout by the image layout section 30 when the main object is not overlapped with the page break. Thereby the degree of freedom of the layout of images can be ensured so that the image creating apparatus 100 can create the album which does not cause the viewer to lose interest.

Figure 3:
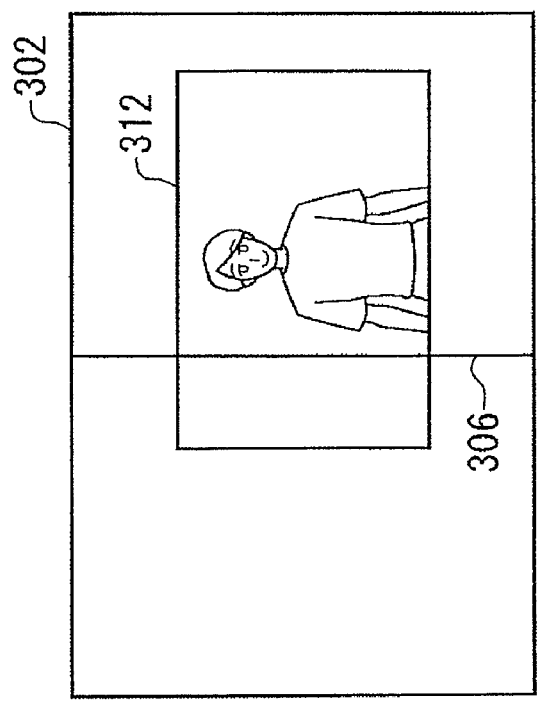
FIG. 3 shows a moving method of an image by a main object moving section 70.
Figure 3:
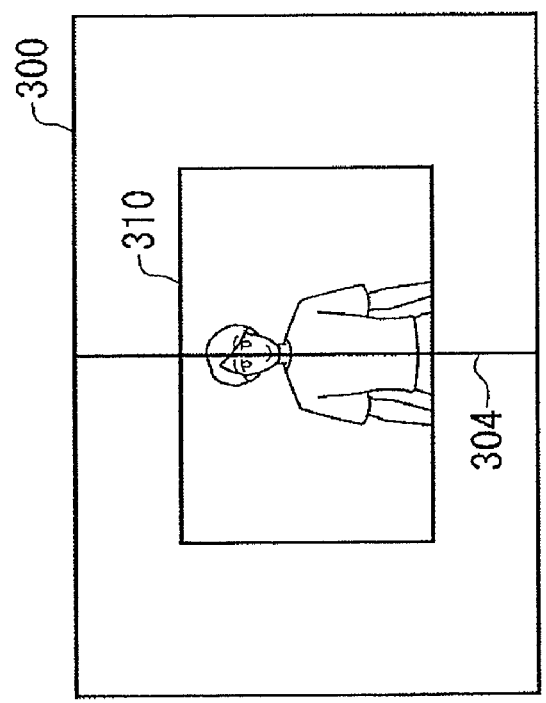

FIG. 3 shows a moving method of an image by a main object moving section 70 according to the present embodiment. The main object moving section 70 moves in the facing page the image judged by the boundary judgment section 60 as that the main object is overlapped with the page break. Additionally, the main object moving section 70 may move the position of the layout frame previously defined in the facing page to the position at which the main object is not overlapped with the page break to fit the image including the main object into the layout frame. Further, the main object moving section 70 may select again a page with the layout in which the main object is not overlapped with the page break to fit the image including the main object into the layout frame.

For example, when the main object included in an image 310 is overlapped with a facing page 300, the main object moving section 70 moves the position of the image 310 in the facing page 30. Then, the main object moving section 70 moves an image 312 in a facing page 302 to prevent the main object included in the image 312 from overlapping with a page break 306.

The album creating apparatus according to the present embodiment can automatically move the position of the image when the main object included in the captured image is overlapped with the page break of the album. Thereby the main object in the image can be prevented from overlapping with the fold of the album, so that the good appearance of the main object can be prevented from being reduced.

Figure 4:
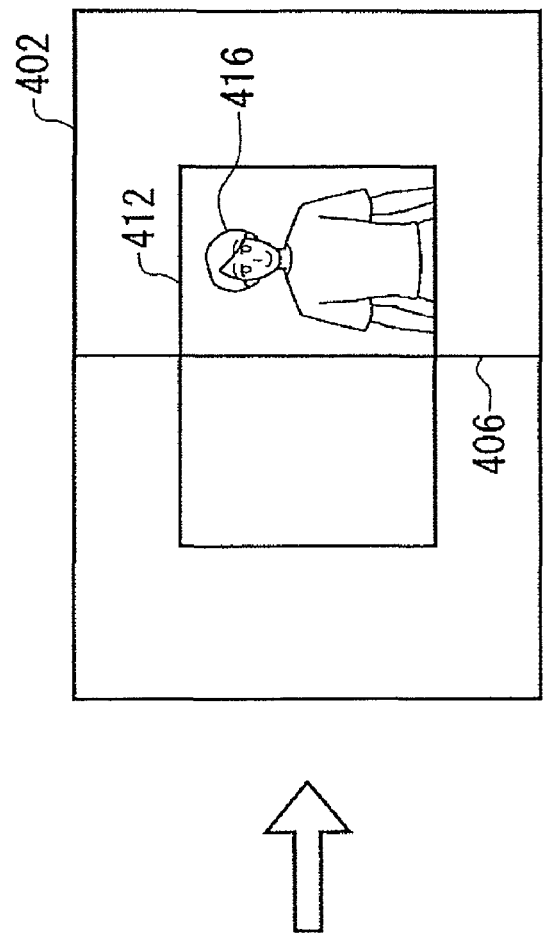
FIG. 4 shows a moving method of an image by a main object moving section 70.
Figure 4:
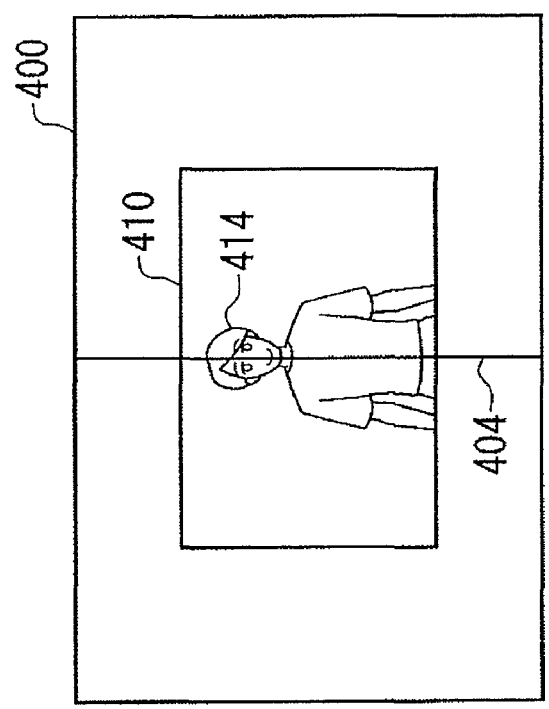

FIG. 4 shows a moving method of an image by a main object moving section 70 according to the present embodiment. When the boundary judgment section judges that the main object included in an image is overlapped with the page break, the main object moving section 70 moves the main object in the image. Then, the main object moving section moves the main object in the facing page such that the main object is not overlapped with the page break.

For example, a main object 414 included in an image 410 is overlapped with a part of a page break 404 in a facing page, for example. In this case, the main object moving section 70 divides the image 410 into the predetermined regions to set partial regions. Ten, the main object moving section calculate spatial frequency for each of the set regions. Next, the main object moving section 70 selects the partial region with the special frequency of which high-frequency component is reduced. Then, the main object moving section 70 enlarges the selected partial region to a predetermined direction. The direction to which the main object moving section 70 enlarges the partial region may be the longitudinal direction and the lateral direction of the partial region. Additionally, the amount of the partial region enlarged by the main object moving section 70 may be the amount to cover the region for the main subject which has not been trimmed when the main object 414 is trimmed into the position at which the main object is not overlapped with the page break 404. Here, when the partial region is enlarged, any interpolation processing such as a nearest neighbor method and a linear interpolation method among the pixels in the direction to which the partial region is enlarged.

Then, the main object moving section 70 trims the main object 414 and moves the same to the position at which the main object 414 is not overlapped with the page break 404 in the facing page 400. Next, the main object moving section 70 overlaps the enlarged partial region with the region for the main object which has not been trimmed. Thereby the main object 416 included in the image 412 can be prevented from overlapping with the page break 406 in the facing page 402 after the main object 414 is moved.

Figure 5:
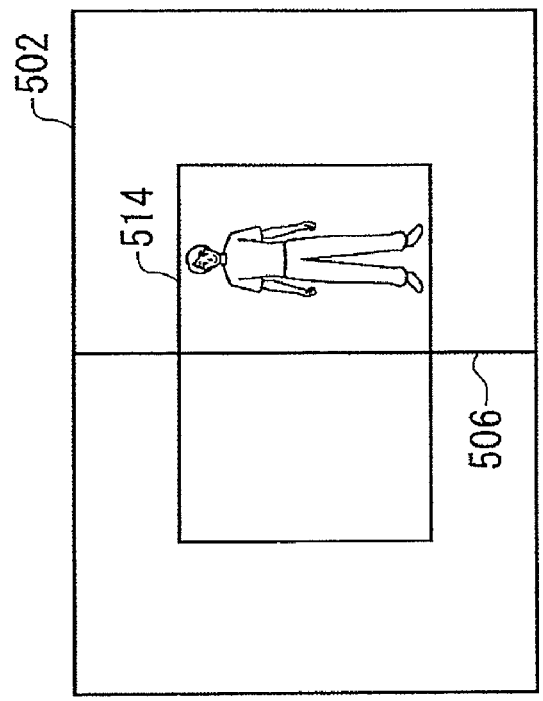
FIG. 5 shows a moving method of an image by a main object moving section 70.
Figure 5:
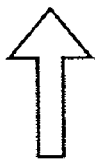
Figure 5:
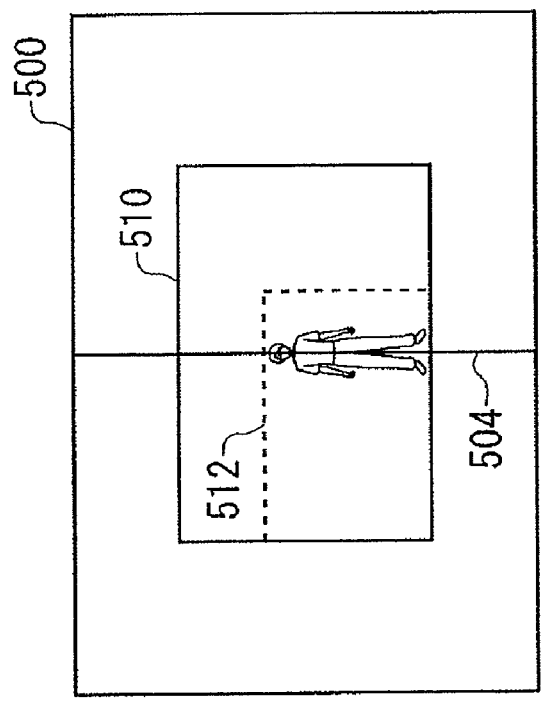

FIG. 5 shows a moving method of an image in a main object moving section 70. The main object moving section 70 trims the partial region including in the main object in the image. Then, the main object moving section 70 may enlarge the trimmed partial region and fit the enlarged partial region into the layout frame of the facing page. Here, the region trimmed by the main object moving section 70 may be determined as such that the main object is not overlapped with the page break when the trimmed partial region is enlarged to be fit into the layout frame.

For example, when the person being the main object included in an image 510 is overlapped with a page break 504 in a facing page 500, the main object moving section 70 trims a partial region 512 including the person being the main object. Next, the main object moving section 70 enlarges the trimmed partial region 512 to the size for the layout frame which is previously set and into which the image is fitted. Then, the main object moving section 70 fits the partial region including the person being the enlarged main object into the layout frame of the facing page 502. Thereby the main object moving section 70 can create the facing page 502 into which the image 514 is fitted.

The album creating apparatus 100 according to the present embodiment can automatically move the main object in the page when the main object including the captured image is overlapped with the fold of the album. Thereby the main object is not covered by the fold so that the viewer can view enough the main object.

Figure 6:
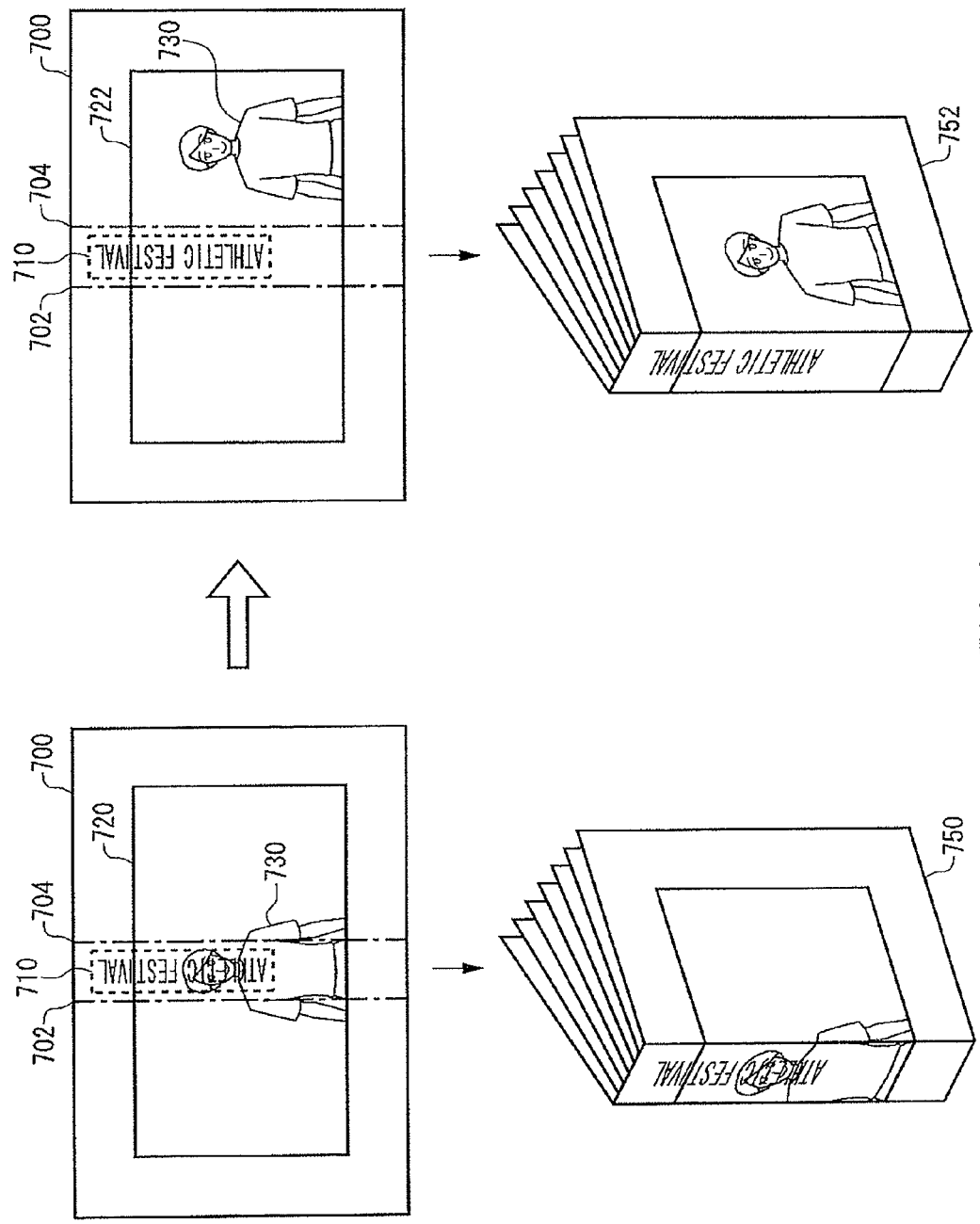
FIG. 6 shows a moving method of an image by a main object moving section 70.

FIG. 6 shows a moving method of an image in a main object moving section 70 according to the present embodiment. For example, the image layout section 30 lays out the image in the backbone of the album. In this case, the image layout section 30 lays out an image 720 into a template 700 of the backbone of the album. That is to say, the image layout section 30 lays out the image 720 into the layout frame previously set in the template 700. Here, a fold 702 and a fold 704 set in the template 700 of the backbone of the album, which are generated at creating the backbone of the album. Additionally, a title frame 710 for the region of the title of the album is set in a template of the backbone 700 of the album. A predetermined character string information is arranged in the title frame 710 based on the theme of the album. For example, a character string such as "athletic festival" may be arranged.

When the image layout section 30 lays out the image 720 into the template 700, the boundary judgment section 60 judges that a main object 730 is overlapped with the title frame 710 based on the position of the title frame indicated by the title frame positional information stored in the title frame positional information storage section 52 and the position of the main object in the image 720. Then, creating a cover 750 of the album, the main object in the image is overlapped with the title frame 710 in the cover 750 of the album so that it is not good for the viewer. Accordingly, in this case, the main object moving section 70 moves the position of the main object 730 in the image 720 to create an image 722. Then, the main object moving section 70 moves the position of the main object 730 in the image 720 so that the image 722 which is not overlapped with any of the fold 702, the fold 704 and the title frame 710 in the template 700. Therefore, the image 722 including the main object 730 can clearly display on the cover 752 of the album.

Figure 7:
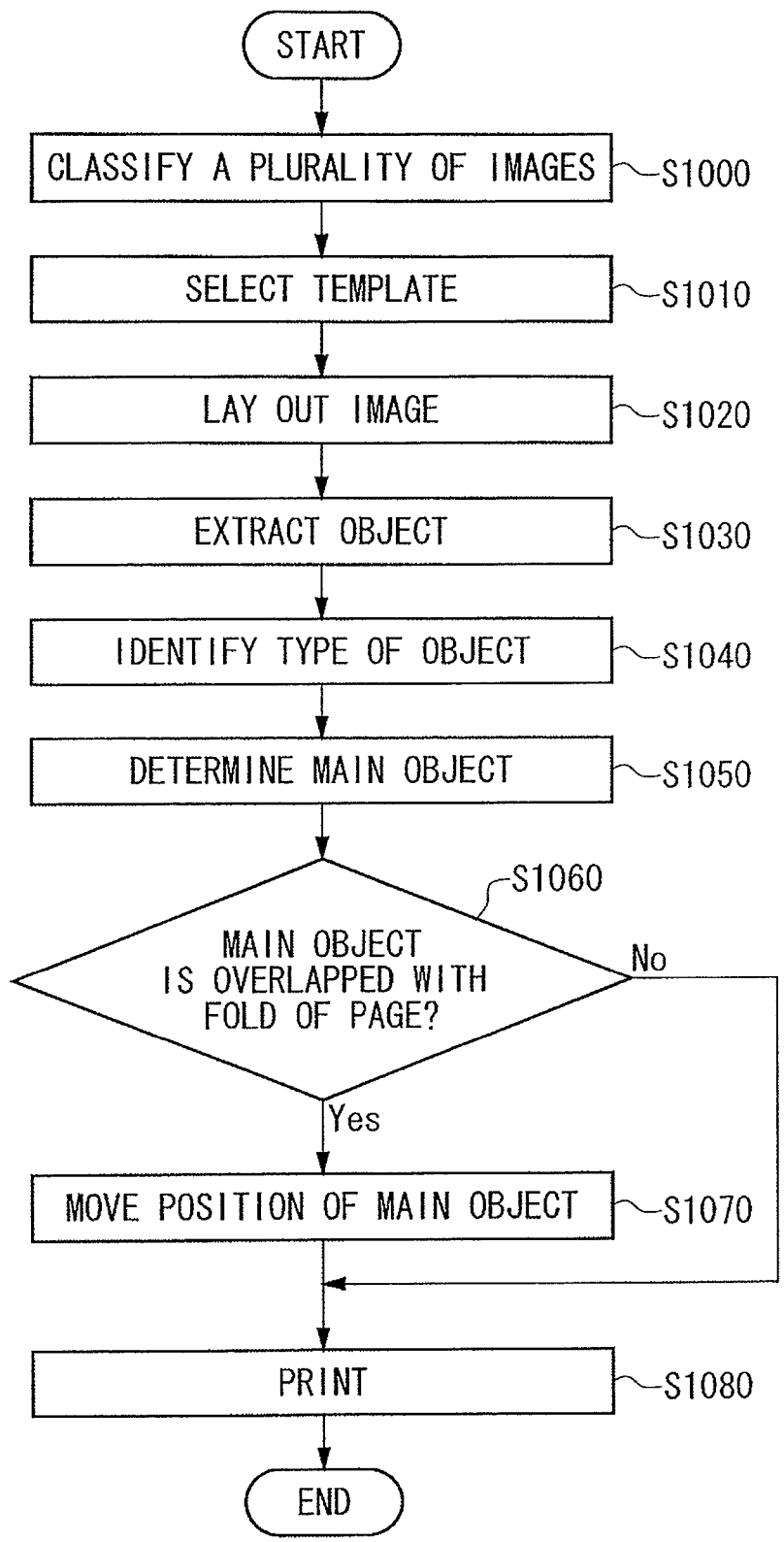
FIG. 7 is a flowchart showing a processing of the album creating apparatus 100.

FIG. 7 is a flowchart of a processing of the album creating apparatus 100 according to the present embodiment. Firstly, the album creating apparatus 100 stores a plurality of captured images received from the image capturing apparatus 150 in the image storage section 10. Next, the plurality of captured images are provided from the image storage section 10 to the image classification section 20. Then, the plurality of captured images are classified into each page of the album based on the image capturing position, the image capturing time and the main object included in the captured image (S1000). Then, the image classification section 20 provides the plurality of classified images to the image layout section 30. Next, the image layout section 30 selects a template of the album (S1010). Here, the template of the album may be the template for the facing page, the obverse cover, the backbone and the back cover of the album.

Then, the image layout section 30 lays out the plurality of images received from the image classification section 20 into the layout frame of the template (S1020). The image layout section 30 may lay out the plurality of images into the layout frame of the template. Next, the image layout section 30 provides the images laid out in the page of the album to the object extracting section 40. The object extracting section 40 extracts the object included in the image laid out in the page of the album (S1030). Then, the object extracted by the object extracting section 40 is provided to the object type identifying section 42. The object type identifying section 42 identifies the type of the object received from the object extracting section 40 (S1040). The type of the object identified by the object type identifying section 42 is provided to the main object determining section 44.

Then, when the object received from the object type identifying section 42 is a person, the main object determining section 44 determines that the object (person) is the main object (S1050). Additionally, the main object determining section 44 calculates the positional information of the main object in the image. Then, the main object determining section 44 provides the image laid out in the page of the album and the positional information on the main object in the image to the boundary judgment section 60. The boundary judgment section 60 judges whether the fold of the page of the album is overlapped with the object received from the main object determining section 44 (S1060).

When the main object is overlapped with the fold of the page (S1060: Yes), the boundary judgment section 60 provides the information indicating that the main object is overlapped with the fold of the page and the image laid out in the page of the album to the main object moving section 70. Then, the main object moving section 70 moves the main object to the position at which the main object is not overlapped with the fold in the page (S1070). Meanwhile, when the main object is not overlapped with the fold of the page (S1060: No), the boundary judgment section 60 provides the image laid out in the album to the printing section 80. Alternatively, the boundary judgment section 60 may provide the image laid out in the page of the album to the display section 84.

Then, the printing section 80 prints the images laid out in the page of the album, which are received from the boundary judgment section 60 and the main object moving section 70 to create the album (S1080). Thereby the album creating apparatus 100 can automatically judge whether the main object included in the image is overlapped with the fold of the page to prevent the main object from overlapping with the fold of the page.

Figure 8:
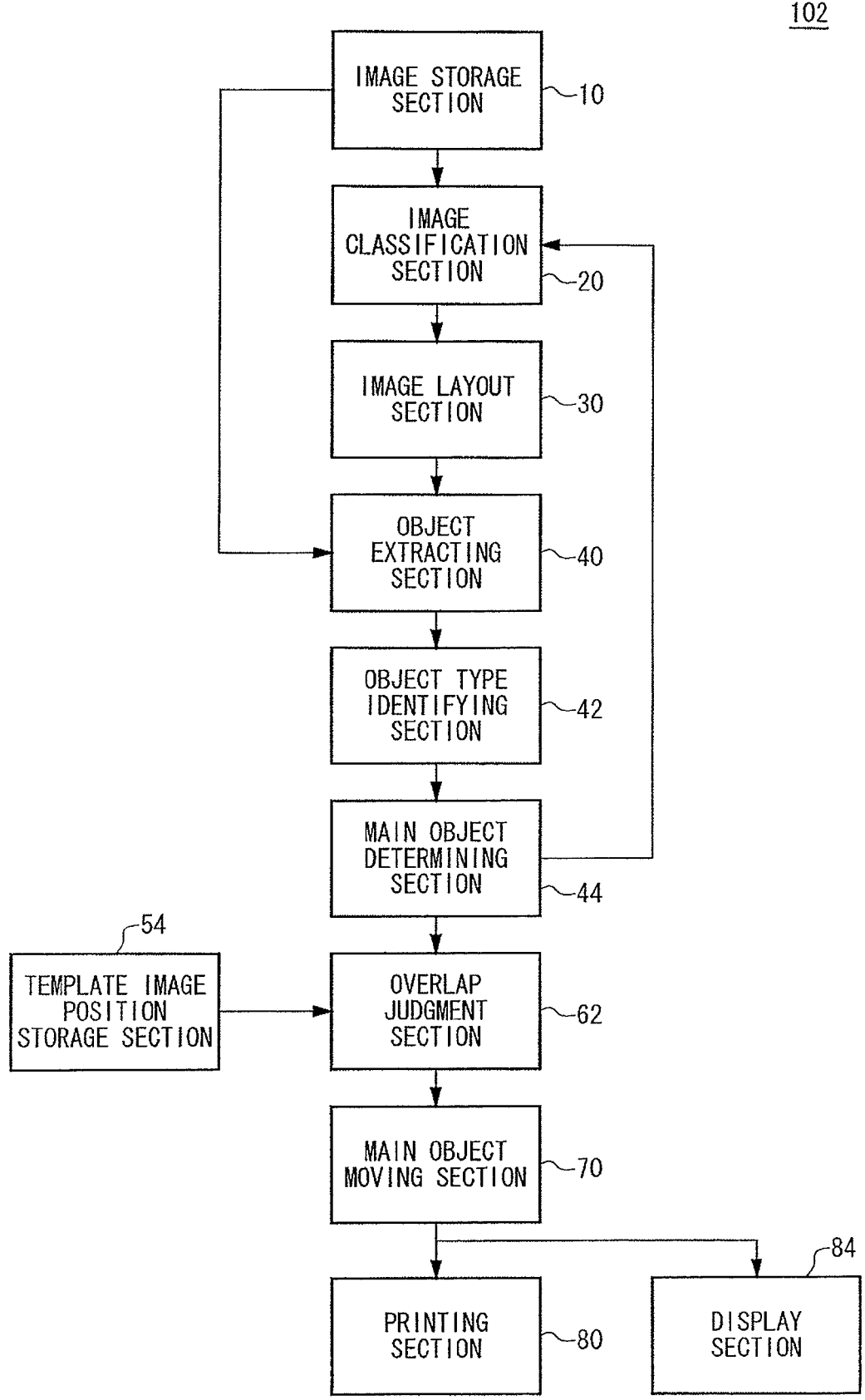
FIG. 8 is a block diagram indicative of the functional configuration of the album creating apparatus 102.

FIG. 8 is a block diagram indicative of the functional configuration of the album creating apparatus 102 according to a second embodiment of the present invention. The album creating apparatus 102 includes an image storage section 10, an image classification section 20, an image layout section 30, an object extracting section 40, an object type identifying section 42, a main object determining section 44, a template image position storage section 54, an overlap judgment section 62, a main object moving section 70, a printing section 80 and a display section 84. Here, the components of the album creating apparatus 102 according to the present embodiment which have the same reference numerals as the components described with reference to FIG. 1-FIG. 7 have the function substantially the same as the components described with reference to FIG. 1-FIG. 7, so that the description is omitted.

Additionally, the album creating apparatus 102 according to the present embodiment may include a part of or all of the functions and the configurations of the album creating apparatus 100 described with reference to FIG. 1-FIG. 7.

Firstly, the image layout section 30 lays out the plurality of images received from the image storage section 10 into the template of the album which is previously generated. Here, the template of the album may include a page template for each page of the album and the template for the cover of the album. Then, the layout frame into which the image is fitted and a template image arranged at a predetermined position in the template may be arranged in the page template and the template for the cover. Here, the template image may be an icon, a clipping object frame and a text frame into which the character string is fitted. Specifically, the template image may be a predetermined image which is arranged at the predetermined position of the album and gives a predetermined visual effect to the user. For example, the template image may be an image having a geometric shape, such as a ribbon, a speech balloon, a star and so forth.

Additionally, the clipping object frame may be a frame into which the image of the object extracted from the image is fitted. For example, the main object determining section 44 may clip the object except for the main object from the image to generate a clipping image. Then, the clipping image generated by the main object determining section 44 may lay out the clipping object frame of the template by the main object determining section 44. Additionally, the text frame may be a frame into which the character information suitable for the theme of the template of the album is fitted. That is to say, the text frame may be an example of the title frame. The image layout section 30 provides the template of the album in which the image has been laid out to the object extracting section 40. Alternatively, the image layout section 30 may provide the template in which the image has been laid out to the overlap judgment section 62.

The template image position storage section 54 stores the position of the template image laid out in the template of the album. The template image position storage section 54 may set the coordinate axis in the template of the album and store the position of the template image as the coordinate data. When a plurality of template images is disposed in the template of the album, the template image position storage section 54 may store the position for each template image in association with each of the plurality of template images. The template image position storage section 54 provides information indicative of the position of the template image in the template to the overlap judgment section 62 based on the control by the overlap judgment section 62.

The overlap judgment section 62 judges whether the main object in the image laid out in the template of the album by the image layout section 30 is overlapped with the position of the template image stored in the template image position storage section 54. Specifically, the overlap determining section 62 compares the position of the template image arranged in the template of the album with the position of the main object in the image laid out in the layout frame. Here, the position of the main object in the image may be calculated as follows: the object extracting section 40 calculates the position of an object to be extracted in the image when the object is extracted from the image; and the object type identifying section 42 identifies the type of the object extracted by the object extracting section 40.

Then, when the main object determining section 44 determines the main object based on the result identified by the object type identifying section 42, the main object determining section 44 may determine that the position of the main object in the image calculated by the object extracting section 40 is a position of the main object in the image. The main object determining section 44 provides the position of the main object in the image laid out in the layout frame of the template to the overlap judgment section 62. The overlap judgment section 62 compares the position of the template image obtained from the template image position storage section 54 with the position of the main object received from the main object determining section 44. Then, the overlap judgment section 62 judges whether the position of the main object in the image is overlapped with the position of the template. The overlap judgment section 62 provides the judged result to the main object moving section 70.

When the overlap judgment section 62 judges that the main object is overlapped with the position of the template image, the main object moving section 70 moves the position of the main object in the template image such that the main object is not overlapped with the template image. That is to say, the main object moving section 70 may move the image including the main object in the template to the direction from which the image leaves the template image so that the main object is not overlapped with the template image.

Additionally, the main object moving section 70 may move the main object judged by the overlap judgment section 62 as that the main object is overlapped with the template image when the overlap judgment section judges that the main object is overlapped with the template image. For example, the main object moving section 70 may trim the main object included in the image to move the main object in the template image. Thereby the main object moving section 70 does not move the position of the image in the template but moves the position of the main object included in the image to prevent the main object from overlapping with the template image.

In the case that the template image arranged in the template is overlapped with the main object included in the image when the image is laid out in the layout frame in the template of the album, the album creating apparatus 102 according to the present embodiment can automatically move the main object to the position at which the template image is not overlapped with the main object. Thereby the main object in the image can be prevented from overlapping with the template image, and in its turn the main object can be prevented from not being capable of viewing.

Figure 9:
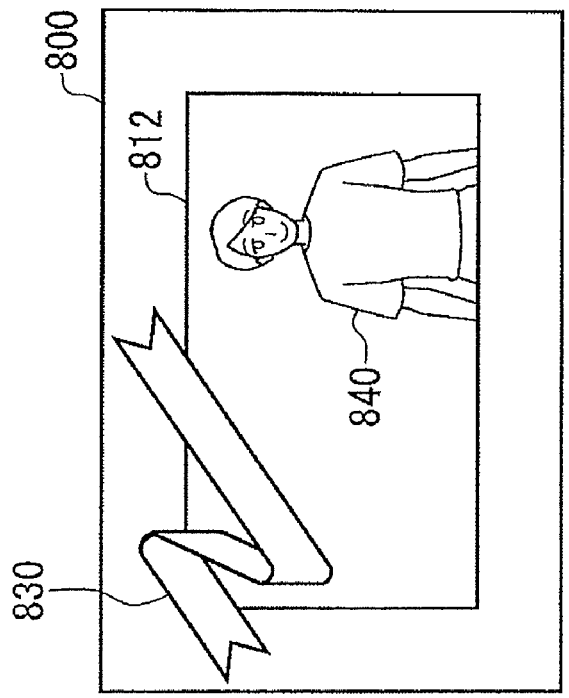
FIG. 9 shows a moving method of an image by a main object moving section 70.
Figure 9:
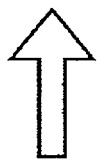
Figure 9:
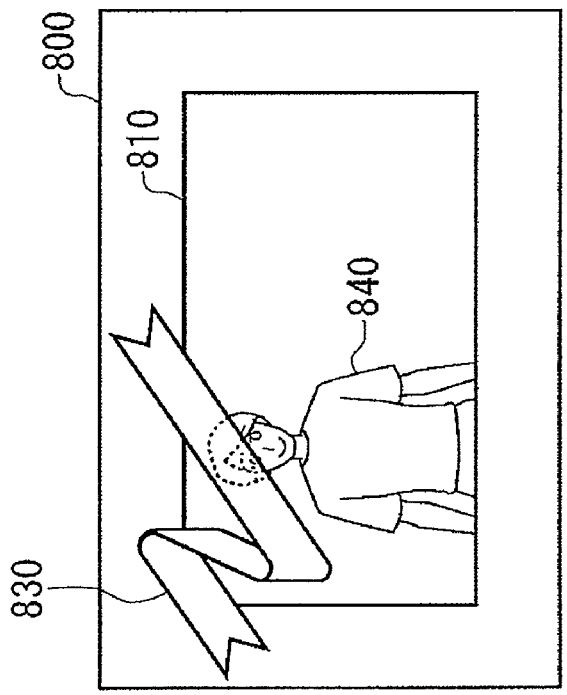

FIG. 9 shows a moving method of an image in a main object moving section 70 according to the present embodiment. For example, when the image layout section 30 lays out an image 810 into a page template 800, a main object 840 included in the image 810 is overlapped with a template image 830. Firstly, the overlap judgment section 62 receives the position of the main object 840 laid out in the page template 800 from the main object determining section 44. Additionally, the overlap determining section 62 acquires the position of the template image 830 arranged in the page template 800 from the template image position storage section 54. Then, the overlap judgment section 62 compares the position of the main object 840 with the position of the template image 830 to judge that the main object 840 is overlapped with the template image 830.

The main object moving section 70 moves the position of the main object 840 included in the image 810 to the position at which the it is not overlapped with the template image 830 based on the result judged by the overlap judgment section 62. For example, the main object moving section 70 may move the position of the image 810 in the page template 800 so as not to overlap the main object 840 with the template image 830. Additionally, the main object moving section 70 may generate an image 812 obtained by trimming the main object into the position at which the main object 840 is not overlapped with the template image 830 and lay out the image 812 in the page template 800. Here, the main object moving section 70 may move the main object in the template image 830 in the same manner of the main object moving section 70 described with reference to FIG. 1-FIG. 7.

Figure 10:
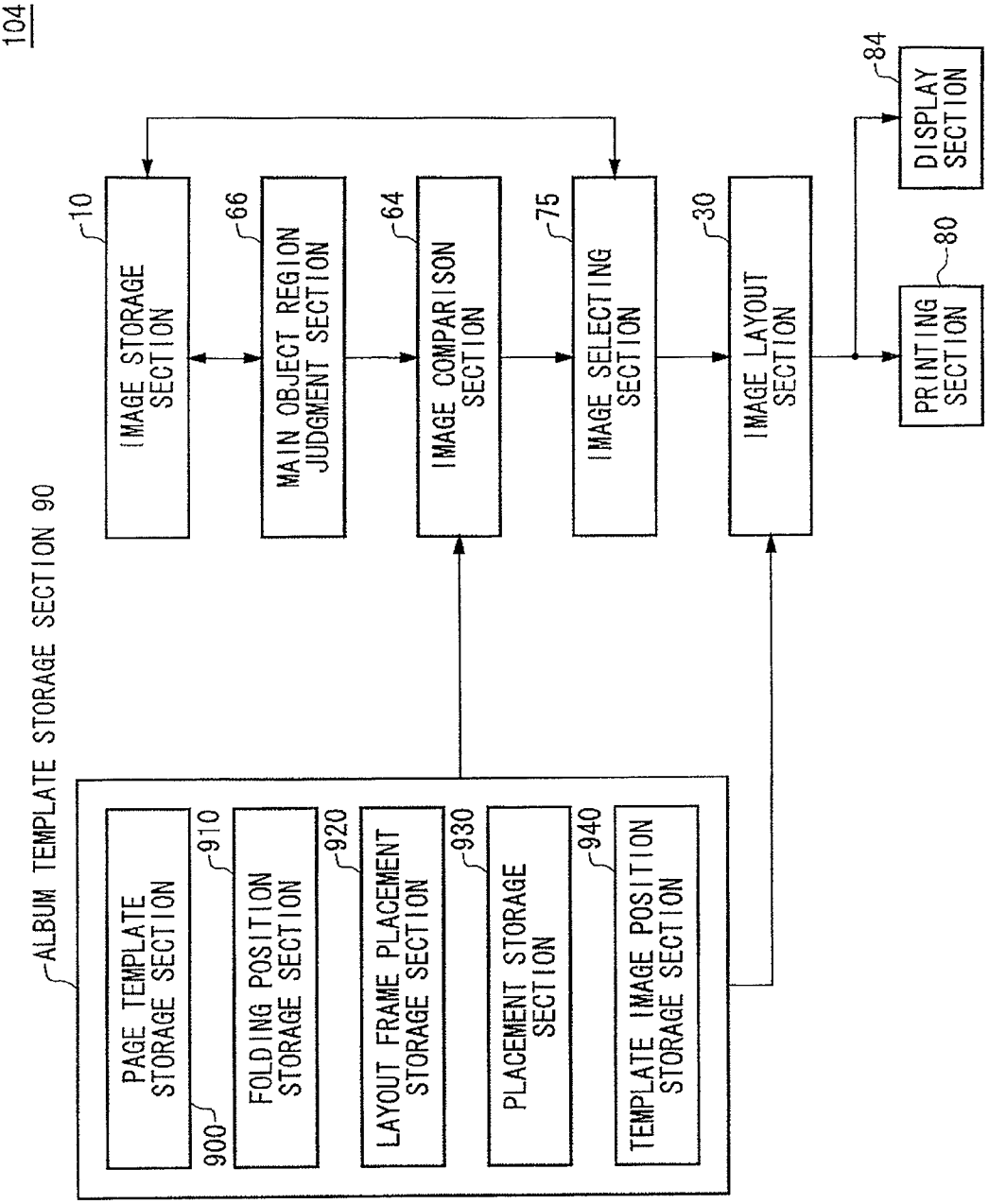
FIG. 10 is a block diagram indicative of the functional configuration of the album creating apparatus 104.

FIG. 10 is a block diagram indicative of the functional configuration of the album creating apparatus 104 according to a third embodiment of the present invention. The album creating apparatus 104 includes an image storage section 10, an image layout section 30, an image comparison section 64, a main object region judgment section 66, an image selecting section 75, a printing section 80, a display section 84 and an album template storage section 90. The album template storage section 90 has a page template storage section 900, a fold position storage section 910, a layout frame position storage section 920, a placement storage section 930 and a template image position storage section 940. Here, the components of the album creating apparatus 104 according to the present embodiment which have the same reference numerals as the components described with reference to FIG. 1-FIG. 9 have the function substantially the same as the components described with reference to FIG. 1-FIG. 9, so that the description is omitted. Additionally, the album creating apparatus 104 according to the present embodiment may include a part of or all of the functions and the configurations of the album creating apparatus 100 described with reference to FIG. 1-FIG. 7. Further, the album creating apparatus 104 according to the present invention may include a part of or all of the functions and the configurations of the album creating apparatus 102 described with reference to FIG. 8 and FIG. 9.

The image storage section 10 stores a plurality of images. The image storage section 10 provides the images to the main object region judgment section 66 and the image selecting section 75 based on the control of the main object region determining section 66 and the image selecting section 75. The main object region determining section 66 judges the region of the main object in the image. Specifically, firstly, the main object region judgment section 66 extracts an object included in the image stored in the image storage section 10. For example, the main object region judgment section 66 extracts the object included in the image through an outline extraction processing and a color distribution analysis processing. In this case, the main object region judgment section 66 calculates the position of the extracted object in the image. Then, the main object region judgment section 66 judges whether the extracted object is the main object. For example, the main object region judgment section 66 may judge whether the extracted object is a person by flesh-color extracting and pattern-matching using the image of the facial parts of the person. Then, when the extracted object is a person, the main object region judgment section 66 may judge that the object (person) is the main object. Additionally, when the position of the extracted object in the image is within a predetermined range from the center of the image, the main object region judgment section 66 may judge that the extracted object is the main object.

Further, the main object region judgment section 66 calculates the object size being the size for the image of the extracted object. For example, the main object region judgment section 66 may calculate as the object size the largest distance from a predetermined edge of an object included in the image to the other edge of the object. Additionally, when the object is a person, the main object may be a facial region of the person. Then, the main object region judgment section 66 may calculate the size for the image of the facial region as the object size. In this case, the object size may be a radius of the circumscribed circle of the facial region of the person. Then, the main object region judgment section 66 may judge that the extracted object is the main object when the size of the extracted object is larger than a predetermined value. The main object region judgment section 66 provides the region of the main object in the image, such as information indicative of the position of the main object in the image and information indicative of the size for the main object in the image to the image comparison section 64.

The album template storage section 90 stores a template for the album. The template of the album stored in the album template storage section 90 may be the template of the album which is set for each of the predetermined themes. The album template storage section 90 stores information such as a template of the page in the album, the position of the fold page, the position of the layout frame previously arranged in the template of the page, the position in the template at which the main object is disposed and the position of the template image previously arranged in the template of the page. Specifically, the album template storage section 90 may include a page template storage section 900, a fold position storage section 910, a layout frame position storage section 920, a placement position storage section 930 and a template image position storage section 940 and also may storage the above described various information in each of the storage sections.

For example, the page template storage section 900 stores the page template being a template of the page included in the template of the album. The page template stored in the page template storage section 900 may be a template for a page of the album, a facing page and a cover page. Additionally, the page template storage section 900 may store the template with the shape of a CD-ROM and a DVD. The fold position storage section 910 stores the position of the fold included in the page template in the layout frame previously disposed in the page template including the fold. When the page template has a plurality of folds, the fold position storage section 910 may store each of the plurality of positions of the folds. Here, the template has the shape of a CD-ROM and a DVD, the fold position storage section 910 may store the position at which the image can not be disposed in the CD-ROM, such as the position of the hole of the CD-ROM and the DVD instead of the position of the fold included in the page template.

The layout frame position storage section 920 stores the position of the layout frame in the page template as the position of the layout frame. Here, the layout frame may be a frame into which the image stored in the image storage section is laid out and the frame into which the object extracted from the image stored in the image storage section 10 is laid out. Additionally, the placement storage section 930 stores the position in the layout frame in which the main object should be included as the main object position. The template image position storage section 940 stores the position of the template image included in the page template in the layout frame previously disposed in the page template of the page including the template image. The fold position storage section 910 included in the album template storage section 90 provides the position of the fold of the page template to the image comparison section 64. Additionally, the template image position storage section 940 provides the position of the template image to the image comparison section 64 based on the control of the image comparison section 64. Further, the album template storage section 90 provides the page template, the position of the layout frame, the layout and the position of the template image to the image layout section 30 based on the control of the image layout section 30.

The image comparison section 64 compares, for each image, the position of the fold in the layout frame received from the fold position storage section 910 with the region for the main object in the image received from the main object region judgment section 66. Then, the image comparison section 64 judges whether the fold of the page template is overlapped with the main object in the image when the image is laid out into the layout frame. Here, when the shape of template is such as CD-ROM, the image comparison section 64 may judge whether the position of the hole of the CD-ROM is overlapped with the region of the main object in the image. Additionally, the image comparison section 64 may compare, for each image, the position of the template image received from the template image position storage section 940 with the region of the main object in the image received from the main object region judgment section 66. Then, the image comparison section 64 may judge whether the template image is overlapped with the main object of the image when the image is laid out into the layout frame. The image comparison section 64 provides the judged result to the image selecting section 75.

The image selecting section 75 selects the image in which the fold of the page template is not overlapped with the main object from the image storage section 10 based on the judged result received from the image comparison section 64 when the image is laid out into the layout frame. Here, when the template has the shape of the CD-ROM, for example, the image selecting section 75 may select the image in which the position of the hole of the CD-ROM is not overlapped with the main object in the image. Additionally, the image selecting section 75 may select the image in which the template image of the page template is not overlapped with the main object in the image based on the judged result received from the image comparison section 64 when the image is laid out into the layout frame. The image layout section 30 lays out the image received from the image selecting section 75 into the layout frame of the page template to create a page of the album or data of the cover of the album. The image layout section 30 provides the created page of the album or the created cover of the album to the printing section 80 or the display section 84.

The printing section 80 prints the page or the cover of the album received from the image layout section 30 on medium such as papers to create an album. Here, the printing section 80 may print the image on the surface of the CD-ROM. Additionally, the display section 84 the page or cover of the album received from the image layout section 30 on a display device such as a monitor as an electronic album. Here, the album creating apparatus 104 according to the present embodiment may include an output section for recording the data of the album generated by the image layout section 30 on a recording medium such as a DVD.

The album creating apparatus 104 according to the present embodiment may compare the position of the fold of the page in the layout frame of the album with the region of the main object included in the image and automatically select the image in which the main object is not overlapped with the fold of the page. Thereby even if the fold of the page is overlapped with the layout frame of the page in creating an album, the album creating apparatus 104 can automatically select the image in which the main object is not overlapped with the fold of the page and lay out the same, so that the main object is not divided by the fold of the page, and in its turn the album with the good appearance can be created.

Additionally, the album creating apparatus 104 according to the present embodiment compares the position of the template in the layout frame of the album with the region of the main object included in the image and automatically select the image in which the main object is not overlapped with the template image. Thereby even if the template image is overlapped with the layout frame of the page in creating the album, the image creating apparatus can automatically select the image in which the main object is not overlapped with the template image, so that the main object can be prevented from not being capable of viewing due to overlapping the template image with the main object.

Figure 11:
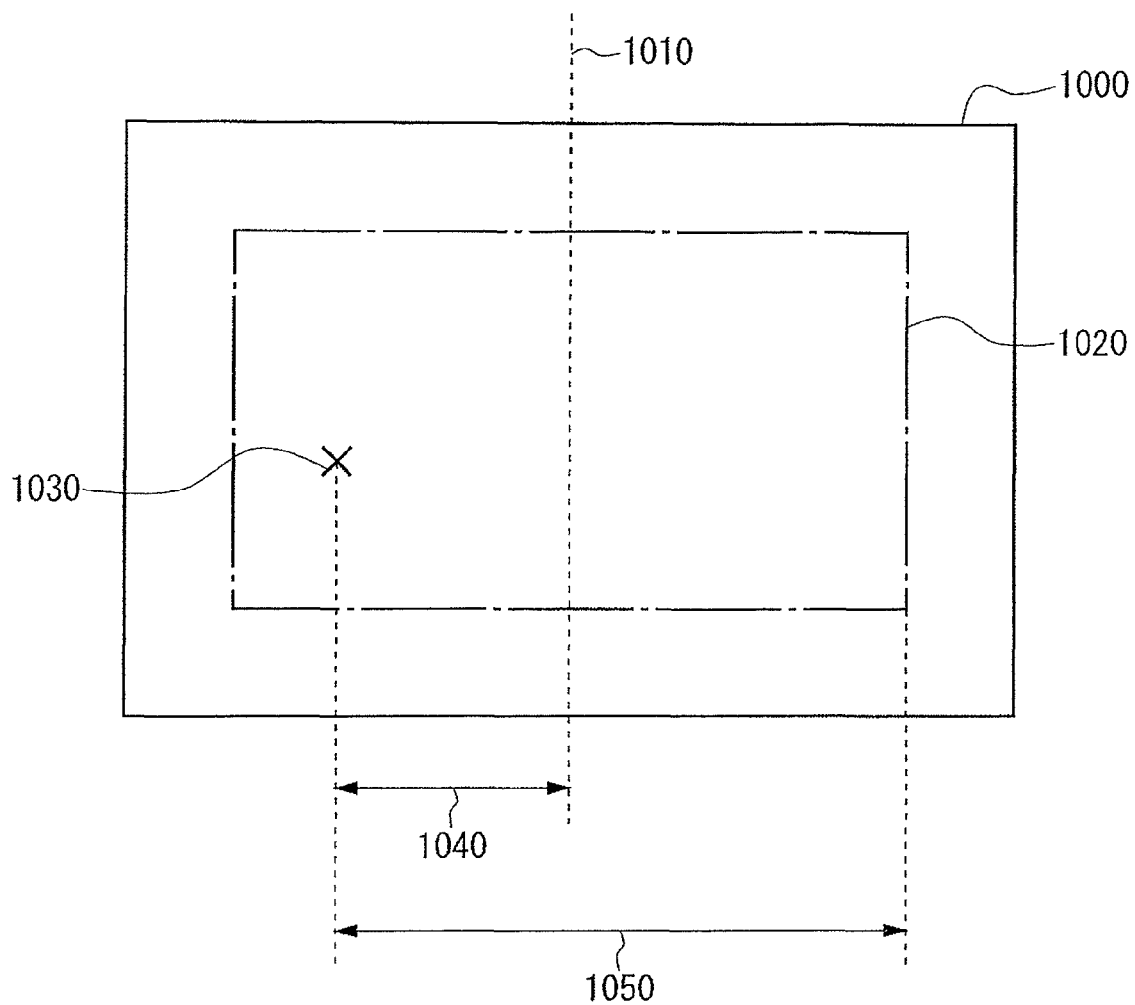
FIG. 11 shows an image selecting method of an image selecting section 75.
Figure 12:
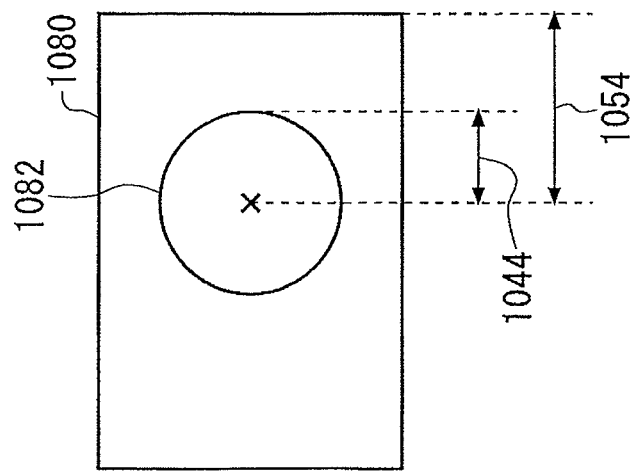
FIG. 12 shows an image selecting method of an image selecting section 75.
Figure 12:
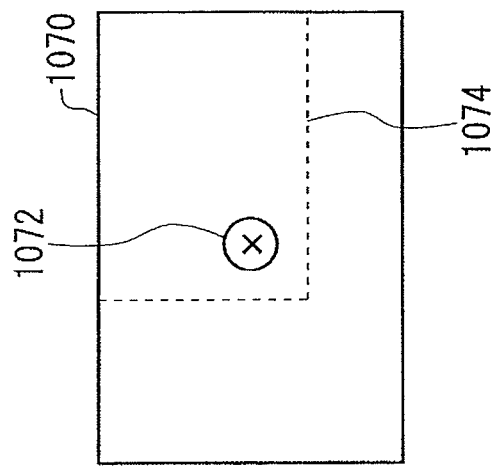
Figure 12:
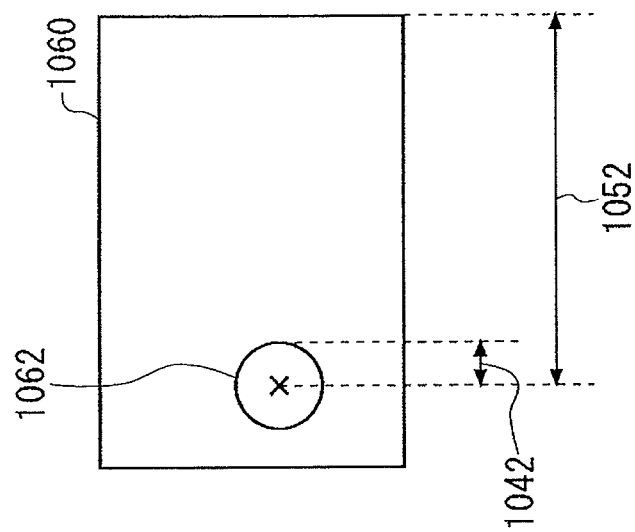

FIG. 11 and FIG. 12 show each example of image selecting method of an image selecting section 75 according to the present embodiment. A layout frame 1020 into which an image is laid out is previously disposed in a page template 1000 as shown in FIG. 11. Then, a main object position 1030 is previously defined in the layout frame 1020 as the position at which the main object should be disposed within the layout frame 1020. Additionally, a fold 1010 of the page is set in the page template 1000. Here, the distance between the main object position 1030 and the fold 1010 is decided as a fold distance 1040. Additionally, the distance between the main object position 1030 and the end of the layout frame 1020 is decided as a layout distance 1050. Meanwhile, an image 1060 as shown in FIG. 12 includes a main object 1062. Here, the size of the main object 1062 in the image 1060 is decided as an object size 1042. Additionally, the distance between the position of the main object 1062 in the image 1060 and the end of the image 1060 as an image distance 1052.

The image comparison section 64 compares the position of the fold 1010 with the region of the main object 1062 and judges whether the main object is overlapped with the fold 1010 when the image is laid out in the layout frame 1020. For example, the image comparison section 64 may calculate the value obtained by multiplying the value obtained by dividing the fold distance 1040 by the object size 1042 by the image distance 1052 as an appropriate evaluated value of the composition. Here, the image comparison section 64 may include an appropriate evaluated value of the composition calculating section for calculating the appropriate evaluated value of the composition. Then, the image comparison section 64 compares the calculated appropriate evaluated value of the composition with the value indicated by the layout distance 1050. When the calculated appropriate evaluated value of the composition is larger than the value indicated by the layout distance 1050, the image comparison section 64 judges that the main object is not overlapped with the fold 1010 if the image 1060 is laid out in the layout frame 1020. Then, the image comparison section 64 provides the judged result to the image selecting section 75. The image selecting section 75 selects the image 1060 as the image to be laid out into the layout frame 1020 based on the judged result by the image comparison section 64. Next, the image layout section 30 lays out the image 1060 selected by the image selecting section 75 into the layout frame 1020.

The image comparison section 64 judges whether the main object is overlapped with the fold 1010 using the above-described comparison method. For example, the image comparison section 64 calculates the appropriate evaluated value of the composition based on the image distance 1054 and the object size found by the position of the main object 1082 in the image 1080, and the fold distance 1040 and the layout distance 1050. In this case, the appropriate evaluated value of the composition calculated by the image comparison section 64 is smaller than the value indicated by the layout distance 1050. Accordingly, the image comparison section 64 judges that the main object 1082 included in the image 1080 is overlapped with the fold 1010. Additionally, in the case of the image 1070 as shown in FIG. 12, the image comparison section may judge as follows: for example, a region 1074 is trimmed from the image 1070, and the size of the region 1074 is enlarged to an image 1070. In this case, the image comparison section 64 calculates the appropriate evaluated value of the composition using the enlarged image as well as the above. Then, when the calculated appropriate evaluated value is larger than the layout distance 1050, the image comparison section 64 may judge that the region of the main object 1072 included in the image which has been trimmed is not overlapped with the fold 1010.

Figure 13:
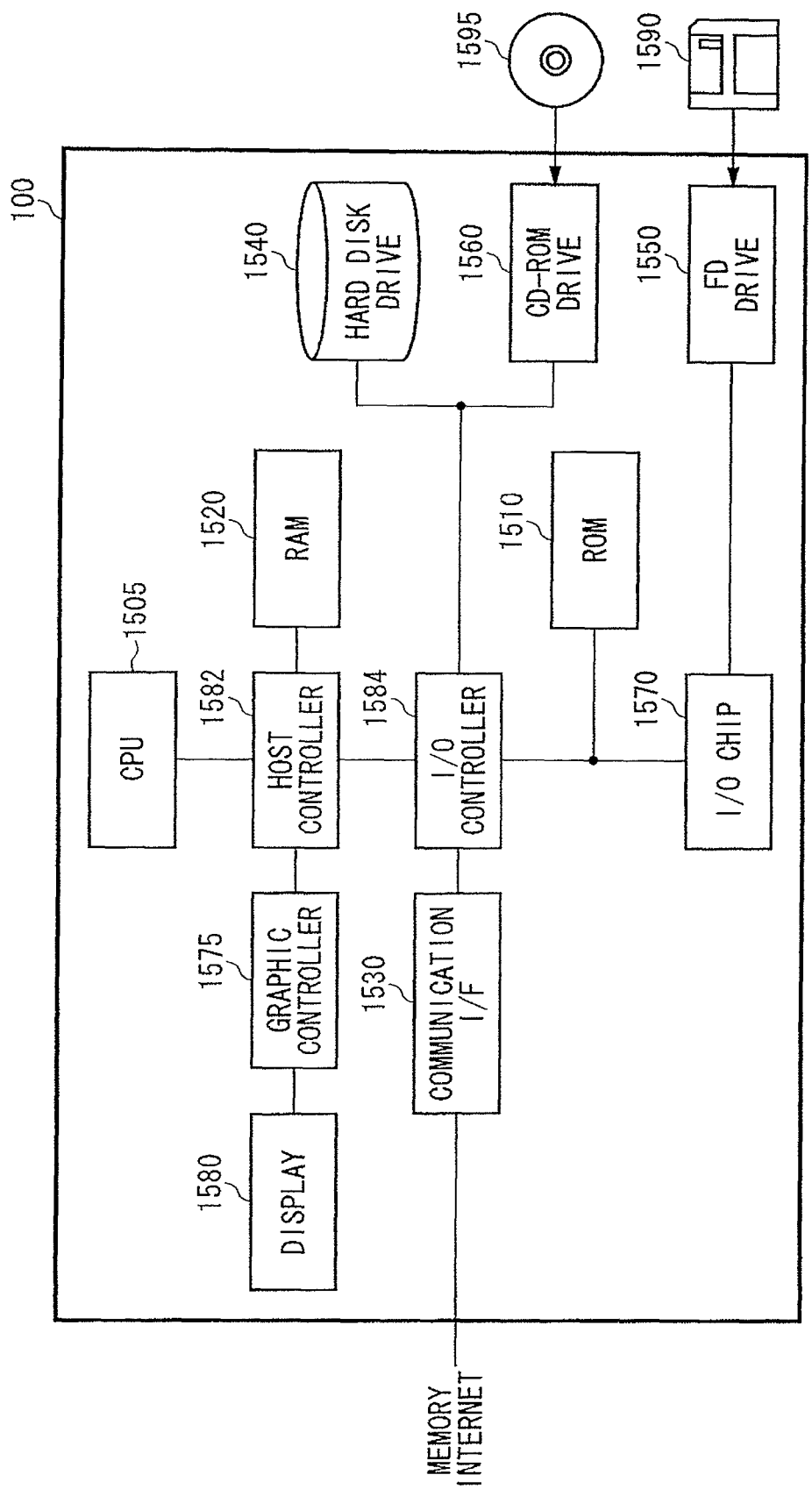
FIG. 13 is a block diagram shows the hardware configuration of the album creating apparatus 100, the album creating apparatus 102 and the album creating apparatus 104.

FIG. 13 shows an example of the hardware configuration of the album creating apparatus 100, the album creating apparatus 102 and the album creating apparatus 104 according to the present embodiment. The album creating apparatus 100, the album creating apparatus 102 and the album creating apparatus 104 according to the present embodiment include a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The communication interface 1530 communicates with the other units through a network. The hard disk drive 1540 stores the program and data used by the CPU 1505 in the album creating apparatus 100, the album creating apparatus 102 and the album creating apparatus 104. The CD-ROM drive 1560 reads the program or data from the CD-ROM 1595 and provides the same to the hard disk drive 1540 through the RAM 1520.

The ROM 1510, and the flexible disk drive 1550 and input/output chip 1570 which are relatively low-speed input/output units are connected to the input/output controller 1584. The ROM 1510 stores a boot program executed by the album creating apparatus 100, the album creating apparatus 102 and the album creating apparatus 104 at activating and a program depending on the hardware of the album creating apparatus 100, the album creating apparatus 102 and the album creating apparatus 104. The flexible disk drive 1550 reads the program or data from a flexible disk 1590 and provides the same to the hard disk drive 1540 through the RAM 1520. The input/output chip 1570 connects various input/output units through the flexible disk drive 1550 and such as a parallel port, a serial port, a keyboard port and a mouse port.

The album creating program provided to the hard disk drive 1540 through the RAM 1520 is stored in a recording medium, such as the flexible disk 1590, the CD-ROM 1595, or an IC card and provided by the user. The album creating program is read from the recording medium, installed to the hard disk drive 1540 of the album creating apparatus 100, the album creating apparatus 102 and the album creating apparatus 104 and executed by the CPU 1505.

The album creating program installed in and executed by the album creating apparatus 100, the album creating apparatus 102 and the album creating apparatus 104 operates the CPU 1505 to cause the album creating apparatus 100, the album creating apparatus 102 and the album creating apparatus 104 to function as the image storage section 10, the image classification section 20, the image layout section 20, the image layout section 30, the object extracting section 40, the object type identifying section 42, the main object determining section 44, the boundary position storage section 50, the title frame positional information storage section 52, the template image position storage section 54, the boundary judgment section 60, the overlap judgment section 62, the image comparison section 64, the main object region judgment section 66, the main object moving section 70, the image selecting section 75, the printing section 80, the display section 84, the album template storage section 90, the page template section 900, the fold position storage section 910, the layout frame position storage section 920, the placement storage section 930 and the template image position storage section 940 which are described with reference to FIG. 1-12.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An album creating apparatus for creating an album by laying out an image into an album template having a page template including a layout frame which is previously arranged to fit the image therein, comprising:
   a fold position storage section that stores the position of a fold included in a page template in a layout frame previously arranged in the page template of a page with the fold;
   a main object region judgment section that judges a region for a main object in the image;
   an image comparison section that compares, for each image, the position of the fold in the layout frame stored in the fold position storage section with the region for the main object in the image judged by the object region judgment section and judges whether the fold of the page template is overlapped with the main object in the image;
   an image selecting section that selects an image in which the fold of the page template is not overlapped with the main object of the image based on the judged result of the image comparison section when the image is arranged in the layout frame; and
   an image layout section that lays out the image selected by the image selecting section into the layout frame.

2. An album creating method for creating an album by laying out an image into an album template having a page template including a layout frame which is previously arranged to fit the image therein, comprising:
   referring a fold position storage section for storing the position of a fold included in a page template in a layout frame previously arranged in the page template of a page with the fold;
   judging a region for a main object in the image;
   comparing, for each image, the position of the fold in a layout frame stored in the fold position referring step with a region for the main object in the image judged in the object region judging step and judges whether the fold of the page template is overlapped with the main object of the image;
   selecting an image in which the fold of the page template with the main object of the image based on the judged result in the image comparing step when the image is arranged in the layout frame; and
   laying out the image selected in the image selecting step into the layout frame.

3. A nontransitory computer readable medium storing thereon a program executable to implement an album creating apparatus for creating an album by laying out an image into an album template having a page template including a layout frame which is previously arranged to fit the image therein, the program operating the album creating apparatus to function as:
   a fold position storage section that stores the position of a fold included in a page template in a layout frame previously arranged in the page template of a page with the fold;
   a main object region judgment section that judges a region for a main object in the image;
   an image comparison section that compares, for each image, the position of the fold in the layout frame stored in the fold position storage section with the region for the main object in the image judged by the object region judgment section and judges whether the fold of the page template is overlapped with the main object in the image;
   an image selecting section that selects an image in which the fold of the page template is not overlapped with the main object of the image based on the judged result of the image comparison section when the image is arranged in the layout frame; and
   an image layout section that lays out the image selected by the image selecting section into the layout frame.

4. An album creating apparatus for creating an album by laying out an image into an album template having a page template including a layout frame which is previously arranged to fit the image therein, comprising:
   a template image position storage section that stores the position of a template image included in a page template in a layout frame previously arranged in a page template of a page including a template image;
   a main object region judgment section that judges the region for a main object in an image;
   an image comparison section that compares, for each image, the position of the template image in the layout frame stored in the template image position storage section with a region for the main object in the image judged by the main object region judgment section and judges whether the template image of the page template is overlapped with the main object in the image when the image is laid out in the layout frame;
   an image selecting section that selects a image in which the template image of the page template is not overlapped with the main object in the image when the image is laid out into the layout frame; and
   an image layout section that lays out the image selected by the image selecting section into the image layout frame.

5. An album creating method for creating an album by laying out an image into an album template having a page template including a layout frame which is previously arranged to fit the image therein, comprising:
   referring a template image position storage section for storing the position of a template image included in a page template in a layout frame previously arranged in a page template of a page including a template image;

judging the region for the main object in an image;

comparing, for each image, the position of the template image in the layout frame referred in the template image position referring step with the region for the main object in the image judged in the main object region judging step and judges whether the template image of the page template is overlapped with the main object in the image when the image is laid out in the layout frame;

selecting an image in which the template image of the page template is not overlapped with the main object in the image based on the judged result in the image comparing step when the image is laid out into the layout frame; and laying out the image selected in the image selecting step into the image layout frame.

6. A non-transitory computer readable medium storing thereon a program executable to implement an album creating apparatus for creating an album by laying out an image into an album template having a page template including a layout frame which is previously arranged to fit the image therein, the program operating the album creating apparatus to function as:

a template image position storage section that stores the position of a template image included in a page template in a layout frame previously arranged in a page template of a page including a template image;

a main object region judgment section that judges the region for a main object in an image;

an image comparison section that compares, for each image, the position of the template image in the layout frame stored in the template image position storage section with a region for the main object in the image judged by the main object region judgment section and judges whether the template image of the page template is overlapped with the main object in the image when the image is laid out in the layout frame;

an image selecting section that selects a image in which the template image of the page template is not overlapped with the main object in the image when the image is laid out into the layout frame; and an image layout section that lays out the image selected by the image selecting section into the image layout frame.

* * * * *